(12) United States Patent
Ryhorchuk et al.

(10) Patent No.: US 7,113,698 B1
(45) Date of Patent: Sep. 26, 2006

(54) FAULT DETECTION AND ISOLATION IN AN OPTICAL NETWORK

(75) Inventors: Kent Ryhorchuk, Sunnyvale, CA (US); Sichao Wang, San Jose, CA (US)

(73) Assignee: CIENA Corporation, Linthicum, MD (US)

( * ) Notice: Subject to any disclaimer, the term of this patent is extended or adjusted under 35 U.S.C. 154(b) by 197 days.

(21) Appl. No.: 10/045,587

(22) Filed: Nov. 6, 2001

Related U.S. Application Data

(63) Continuation-in-part of application No. 09/648,672, filed on Aug. 23, 2000.

(60) Provisional application No. 60/152,138, filed on Aug. 24, 1999.

(51) Int. Cl.
*H04B 10/08* (2006.01)

(52) U.S. Cl. .............. 398/10; 398/17; 398/11; 370/217; 370/216

(58) Field of Classification Search .......... 398/1–7, 398/10, 11, 17, 18, 25, 37, 135, 79, 20; 370/386, 370/217, 216
See application file for complete search history.

(56) References Cited

U.S. PATENT DOCUMENTS

| | | | | |
|---|---|---|---|---|
| 4,736,359 A | * | 4/1988 | Cohen et al. ............ | 398/42 |
| 5,532,862 A | * | 7/1996 | Tada et al. ............. | 398/4 |
| 5,914,794 A | * | 6/1999 | Fee et al. .............. | 398/20 |
| 6,088,141 A | * | 7/2000 | Merli et al. ............ | 398/5 |
| 6,377,374 B1 | * | 4/2002 | Davis et al. ........... | 398/82 |
| 6,665,262 B1 | * | 12/2003 | Lindskog et al. ........ | 370/216 |

\* cited by examiner

*Primary Examiner*—David C. Payne
(74) *Attorney, Agent, or Firm*—Dougherty Clements; Christopher L. Bernard; Tyler S. Brown

(57) ABSTRACT

A system for detecting faults in an optical network having switching nodes and amplifier nodes is provided. According to one aspect of the system, one or more amplifier nodes are coupled between two switching nodes. Each amplifier node is capable of detecting a fault condition, such as a loss-of-signal (LOS) condition, on an incoming line. Upon detecting the LOS condition, the amplifier node generates a fault report which is then forwarded to a switching node. The switching node uses information from the fault report to initiate switching actions, if any, to restore traffic. According to another aspect of the system, each amplifier node is configured to receive a fault report received from another amplifier node and forward such fault report to a switching node. Each amplifier node is further configured to prioritize a fault condition identified in a fault report received from another amplifier node and the fault condition detected on its incoming line.

28 Claims, 29 Drawing Sheets

| FIG.10A-1 | FIG.10A-2 |
| FIG.10A-3 | FIG.10A-4 |

FIG.10A

INTRA-NODE FIBER FAULT HANDLING

LEGEND:
- RS: RING SWITCH
- DRS: RING SWITCH DELAYED
- EQ: EQUIPMENT SWITCH
- DEQ: EQUIPMENT SWITCH DELAYED
- LOS: LOSS OF SIGNAL AT RECEIVER(S)
- ▓ INDICATES A RESULTING ACTION THAT DOES NOT MATCH THE DESIRED ACTION FOR THE FAILURE

| COMPONENT | CONNECTING FIBER | LOCAL NODE EFFECT | DOWNSTREAM NODE EFFECT | DESIRED PROTECTION ACTION ||||||
|---|---|---|---|---|---|---|---|---|
| | | | | OPEN NODE | PASSTHRU NODE | BSAME PASSTHRU | BOPPOSITE PASSTHRU | RSM GLASSTHRU |
| LINE/ POSTAMP | TO WPS | WORKING, AND PCA DROPS SEE LOS | IF LOCAL NODE ADDS TRAFFIC, DOWNSTREAM NEIGHBOR WPS RECEIVE PIN DETECTS LIGHT. OTHERWISE, DOWNSTREAM NEIGHBOR WPS RECEIVE PIN DETECTS NO LIGHT. LOCAL PASSTHRU CHANNELS DETECT LOS DOWNSTREAM. LOCAL ADD CHANNELS ARE OK DOWNSTREAM. | RS | RS | RS | RS | RS |
| | FROM WPS | NO IMPACT | DOWNSTREAM NEIGHBOR WPS RECEIVE PIN DETECTS NO LIGHT. LOCAL PASSTHRU OR ADD CHANNELS REPORT LOS DOWNSTREAM. | RS | RS | RS | RS | RS |
| | TO UNSWITCHED BWDM | LOCAL WORKING, UCA, AND PCA DROPS SEE LOS | IF LOCAL NODE ADDS TRAFFIC, DOWNSTREAM NEIGHBOR WPS RECEIVE PIN DETECTS LIGHT. OTHERWISE, DOWNSTREAM NEIGHBOR WPS RECEIVE PIN DETECTS NO LIGHT. LOCAL PASSTHRU CHANNELS DETECT LOS DOWNSTREAM. LOCAL ADD CHANNELS ARE OK DOWNSTREAM. | RS | RS | RS | RS | RS |
| | FROM UNSWITCHED BWDM | NO IMPACT | DOWNSTREAM NEIGHBOR WPS RECEIVE PIN DETECTS NO LIGHT. LOCAL PASSTHRU OR ADD CHANNELS REPORT LOS DOWNSTREAM. | RS | RS | RS | RS | RS |
| | TO/FROM OSC | DO NOT PROTECT AGAINST OSC FAILURE—USE AS RING SWITCH TRIGGER IF APPLICABLE. ||||||||
| | TO NEIGHBOR | NO IMPACT | DOWNSTREAM NEIGHBOR WPS RECEIVE PIN DETECTS NO LIGHT. LOCAL PASSTHRU OR ADD CHANNELS REPORT LOS DOWNSTREAM. | RS | RS | RS | RS | RS |

| | | | | | | | | |
|---|---|---|---|---|---|---|---|---|
| PREAMP | FROM NEIGHBOR | LOCAL WORKING, UCA, AND PCA DROPS SEE LOS | IF LOCAL NODE ADDS TRAFFIC, DOWNSTREAM NEIGHBOR WPS RECEIVE PIN DETECTS LIGHT. OTHERWISE, DOWNSTREAM NEIGHBOR WPS RECEIVE PIN DETECTS NO LIGHT. LOCAL PASSTHRU CHANNELS DETECT LOS DOWNSTREAM. LOCAL ADD CHANNELS ARE OK DOWNSTREAM. | R | R | R | R | R |
| | TO WPS OR UNSWITCHED BAND | WORKING AND PCA DROPS SEE LOS | IF LOCAL NODE ADDS TRAFFIC, DOWNSTREAM NEIGHBOR WPS RECEIVE PIN DETECTS LIGHT. OTHERWISE, DOWNSTREAM NEIGHBOR WPS RECEIVE PIN DETECTS NO LIGHT. LOCAL PASSTHRU CHANNELS DETECT LOS DOWNSTREAM. LOCAL ADD CHANNELS ARE OK DOWNSTREAM. | R | R | R | R | R |
| | FROM LINE CARD | WORKING AND PCA DROPS SEE LOS | IF LOCAL NODE ADDS TRAFFIC, DOWNSTREAM NEIGHBOR WPS RECEIVE PIN DETECTS LIGHT. OTHERWISE, DOWNSTREAM NEIGHBOR WPS RECEIVE PIN DETECTS NO LIGHT. LOCAL PASSTHRU CHANNELS DETECT LOS DOWNSTREAM. LOCAL ADD CHANNELS ARE OK DOWNSTREAM. | R | R | R | R | R |
| WPS | WORKING FROM RSM | NO IMPACT | LOCAL PASSTHRU AND ADD WORKING CHANNELS REPORT LOS DOWNSTREAM. IF LOCAL NODE HAS PROTECT ACCESS TRAFFIC, DOWNSTREAM NEIGHBOR WPS RECEIVE PIN DETECTS LIGHT. IF NO PROTECT ACCESS TRAFFIC, DOWNSTREAM NEIGHBOR WPS RECEIVE PIN DETECTS NO LIGHT. | EQ | EQ | EQ | EQ | EQ |
| | PROTECT FROM RSM (NO ACTION TAKEN SINCE PROTECT EQUIPMENT) | NO IMPACT | LOCAL PASSTHRU AND ADD PCA CHANNELS REPORT LOS DOWNSTREAM. | N/A | N/A | N/A | N/A | N/A |
| | WORKING FROM BACKUP BWDM | NO IMPACT | LOCAL PASSTHRU AND ADD WORKING CHANNELS REPORT LOS DOWNSTREAM. IF LOCAL NODE HAS PROTECT ACCESS | N/A | N/A | N/A | N/A | N/A |

| OSC LOS<br>LINE IN LOS<br>ACTION: RS | OSC OK<br>WPS IN LOS<br>RESULT: LOS | OSC OK<br>LINE IN OK<br>RESULT: LOS | OSC OK<br>LINE IN OK<br>RESULT: LOS | N/A | N/A |
|---|---|---|---|---|---|
| OSC LOS<br>LINE IN LOS<br>ACTION: RS | OSC OK<br>WPS IN LOS<br>RESULT: LOS | OSC OK<br>LINE IN OK<br>RESULT: LOS | OSC OK<br>LINE IN OK<br>RESULT: LOS | N/A | N/A |
| OSC LOS<br>LINE IN LOS<br>ACTION: RS | OSC OK<br>WPS IN LOS<br>RESULT: LOS | OSC OK<br>LINE IN OK<br>RESULT: LOS | OSC OK<br>LINE IN OK<br>RESULT: LOS | N/A | N/A |
| OSC LOS<br>LINE IN LOS<br>ACTION: RS | OSC OK<br>WPS IN LOS<br>RESULT: LOS | OSC OK<br>LINE IN OK<br>RESULT: LOS | OSC OK<br>LINE IN OK<br>RESULT: LOS | N/A | N/A |
| OSC LOS<br>LINE IN LOS<br>ACTION: RS | OSC OK<br>WPS IN LOS<br>RESULT: LOS | OSC OK<br>LINE IN OK<br>RESULT: LOS | OSC OK<br>LINE IN OK<br>RESULT: LOS | N/A | N/A |
| OSC LOS<br>LINE IN LOS<br>ACTION: RS | OSC OK<br>WPS IN LOS<br>RESULT: LOS | OSC OK<br>LINE IN OK<br>RESULT: LOS | OSC OK<br>LINE IN OK<br>RESULT: LOS | N/A | N/A |
| OSC LOS<br>LINE IN LOS<br>ACTION: RS | OSC OK<br>WPS IN LOS<br>RESULT: LOS | OSC OK<br>LINE IN OK<br>RESULT: LOS | OSC OK<br>LINE IN OK<br>RESULT: LOS | N/A | N/A |
| OSC LOS<br>LINE IN LOS<br>ACTION: RS | OSC OK<br>WPS IN LOS<br>RESULT: LOS | OSC OK<br>LINE IN OK<br>RESULT: LOS | OSC OK<br>LINE IN OK<br>RESULT: LOS | N/A | N/A |
| OSC LOS<br>LINE IN LOS<br>ACTION: RS | OSC OK<br>WPS IN LOS<br>RESULT: LOS | OSC OK<br>LINE IN OK<br>RESULT: LOS | OSC OK<br>LINE IN OK<br>RESULT: LOS | N/A | N/A |
| OSC LOS<br>LINE IN LOS<br>ACTION: RS | OSC OK<br>WPS IN LOS<br>RESULT: LOS | OSC OK<br>LINE IN OK<br>RESULT: LOS | OSC OK<br>LINE IN OK<br>RESULT: LOS | N/A | N/A |

| | | | | | | | |
|---|---|---|---|---|---|---|---|
| RSM | WORKING TO RSM | LOCAL WORKING CHANNEL DROPS SEE LOS | IF LOCAL NODE ADDS WORKING CHANNELS OR CARRIES PCA TRAFFIC, DOWNSTREAM NEIGHBOR WPS RECEIVE PIN DETECTS LIGHT. LOCAL PASSTHRU WORKING CHANNELS SEE LOS DOWNSTREAM. LOCAL ADD CHANNELS ARE OK DOWNSTREAM. | EQ | EQ | EQ | EQ | EQ |
| | PROTECT TO RSM (NO ACTION TAKEN SINCE PROTECT EQUIPMENT) | PROTECT ACCESS DROPS SEE LOS. | | N/A | N/A | N/A | N/A | N/A |
| | WORKING FROM PRIMARY BWDM | | LOCAL PASSTHRU AND ADD WORKING CHANNELS REPORT LOS DOWNSTREAM. PCA CHANNELS OK. IF LOCAL NODE HAS PCA DOWNSTREAM NEIGHBOR SEES LIGHT. | EQ | EQ | EQ | EQ | EQ |
| | PROTECT FROM BWDM (NO ACTION TAKEN SINCE PROTECT EQUIPMENT) | | LOCAL ADD AND PASSTHRU PCA CHANNELS REPORT LOS | N/A | N/A | N/A | N/A | N/A |
| | WORKING TO PRIMARY BWDM | LOCAL WORKING CHANNEL DROPS SEE LOS | IF LOCAL NODE ADDS WORKING CHANNELS OR CARRIES PCA TRAFFIC, DOWNSTREAM NEIGHBOR WPS RECEIVE PIN DETECTS LIGHT. LOCAL PASSTHRU WORKING CHANNELS SEE LOS DOWNSTREAM. LOCAL ADD CHANNELS ARE OK DOWNSTREAM. | EQ | EQ | EQ | EQ | EQ |

| | | | | | | | | |
|---|---|---|---|---|---|---|---|---|
| BWDM | PROTECT TO BWDM (NO ACTION TAKEN SINCE PROTECT EQUIPMENT) | | | | | | | |
| | TO CWDM | LOCAL CHANNEL DROPS SEE LOS | LOCAL DROP AND PASSTHRU PCA CHANNELS REPORT LOS | N/A | N/A | N/A | N/A | N/A |
| | FROM CWDM | NO IMPACT | NO IMPACT | EQ (LOS IF UCA) | EQ (LOS IF UCA) | EQ (LOS IF UCA) | EQ (LOS IF UCA) | EQ (LOS IF UCA) |
| | TO BWDM (FROM RSM TOWARD PASSTHRU) | LOCAL CHANNEL DROPS DOWNSTREAM OF FAILURE SEE LOS | CWDM ADD CHANNELS SEE DOWNSTREAM LOS. OTHER ADD CHANNELS AND PASSTHRU ARE OK. | EQ (LOS IF UCA) | EQ (LOS IF UCA) | EQ (LOS IF UCA) | N/A | N/A |
| | FROM BWDM (FROM PASSTHRU TOWARD RSM) | NO IMPACT | PASSTHRU WORKING CHANNELS SEE LOS DOWNSTREAM. | EQ | EQ | EQ | N/A | N/A |
| | TO/FROM BWDM (PASSTHRU) | NO IMPACT | PASSTHRU CHANNELS SEE LOS DOWNSTREAM. ADDED CHANNELS "UPSTREAM" OF THE FAILURE SEE LOS DOWNSTREAM. CHANNELS ADDED FOLLOWING FAILURE ARE OK. | N/A | EQ | EQ | N/A | N/A |
| | | | PASSTHRU CHANNELS SEE LOS DOWNSTREAM. ADDED CHANNELS ARE OK DOWNSTREAM. | N/A | N/A | N/A | N/A | N/A |
| WCI | TO CWDM | NO IMPACT | | LOS | LOS | LOS | LOS | LOS |
| | FROM CWDM | LOCAL LOS | | LOS | LOS | LOS | LOS | LOS |

FIG.10B-3

| N/A | OSC OK LINE IN OK RESULT: LOS | OSC OK LINE IN OK RESULT: LOS | OSC OK LINE IN OK RESULT: LOS | N/A | N/A | N/A | LOS |
| --- | --- | --- | --- | --- | --- | --- | --- |
| N/A | OSC OK LINE IN OK RESULT: LOS | OSC OK LINE IN OK RESULT: LOS | OSC OK LINE IN OK RESULT: LOS | OSC OK LINE IN OK RESULT: LOS | N/A | N/A | LOS |
| N/A | OSC OK LINE IN OK RESULT: LOS | OSC OK LINE IN OK RESULT: LOS | OSC OK LINE IN OK RESULT: LOS | N/A | N/A | N/A | LOS |
| N/A | N/A | N/A | N/A | N/A | N/A | N/A | LOS |
| N/A | N/A | N/A | N/A | N/A | N/A | N/A | LOS |
| N/A | OSC OK LINE IN OK RESULT: LOS | OSC OK LINE IN OK RESULT: LOS | OSC OK LINE IN OK RESULT: LOS | N/A | N/A | N/A | LOS |
| N/A | OSC OK LINE IN OK RESULT: LOS | OSC OK LINE IN OK RESULT: LOS | OSC OK LINE IN OK RESULT: LOS | OSC OK LINE IN OK RESULT: LOS | N/A | N/A | LOS |
| N/A | OSC OK LINE IN OK RESULT: LOS | OSC OK LINE IN OK RESULT: LOS | OSC OK LINE IN OK RESULT: LOS | N/A | N/A | N/A | LOS |
| N/A | N/A | N/A | N/A | N/A | N/A | N/A | LOS |
| N/A | N/A | N/A | N/A | N/A | N/A | N/A | LOS |

FIG.10B-4

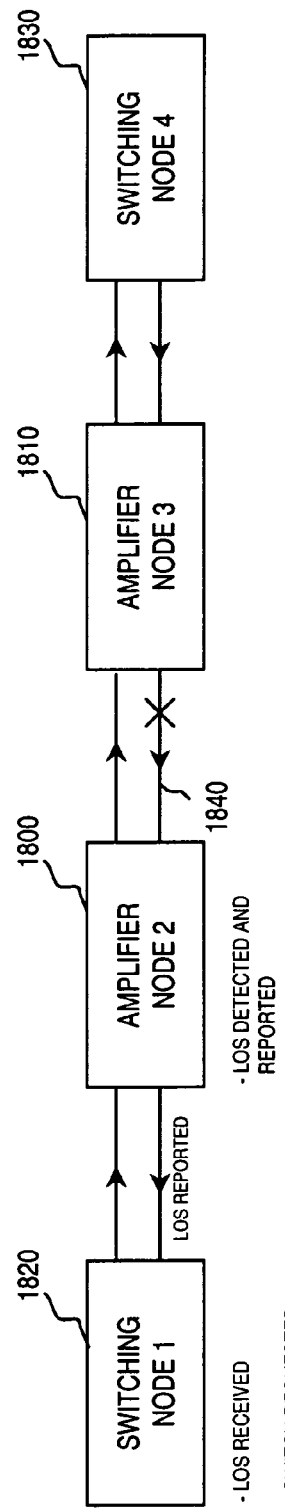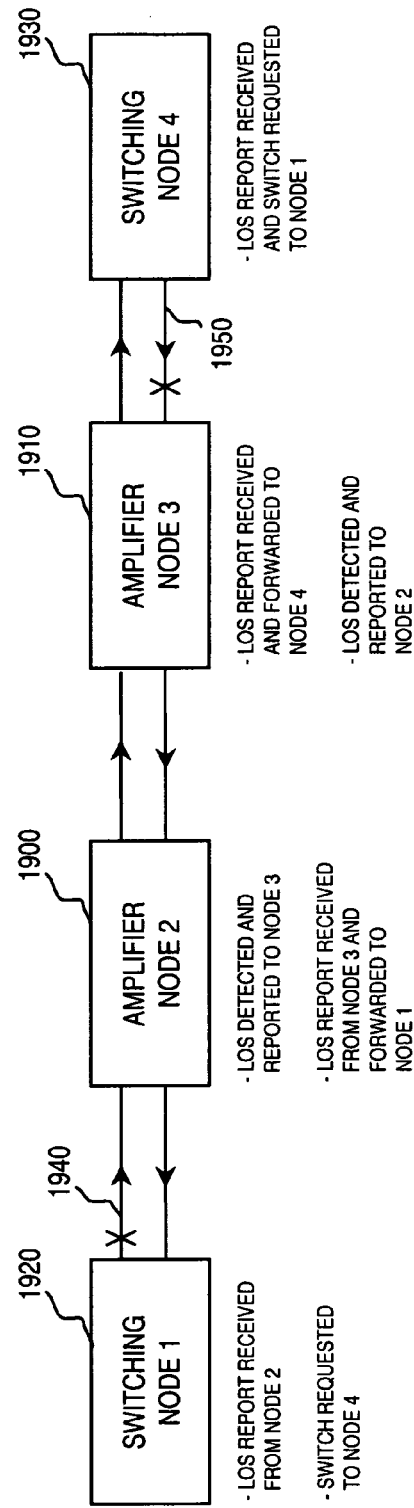

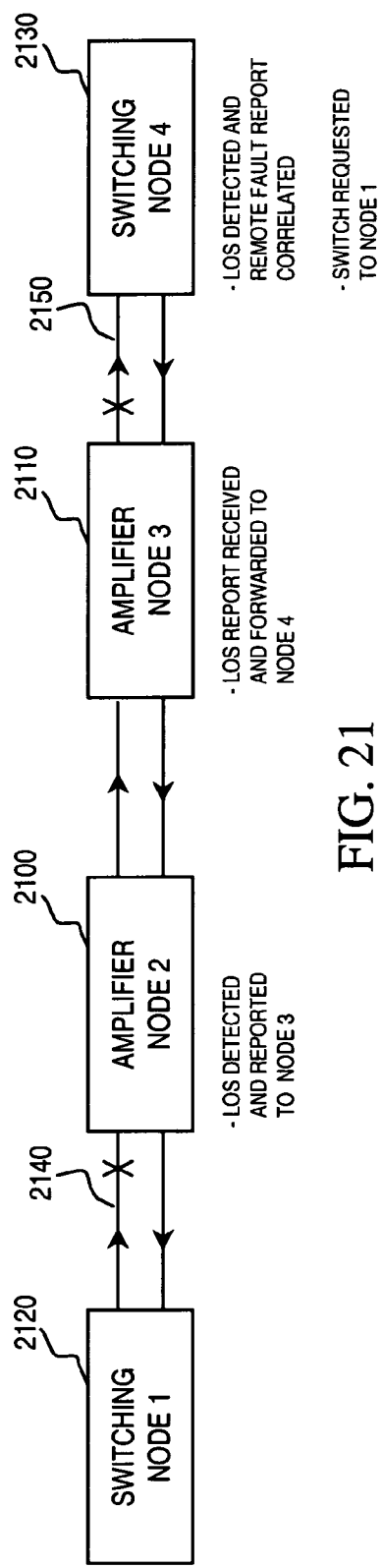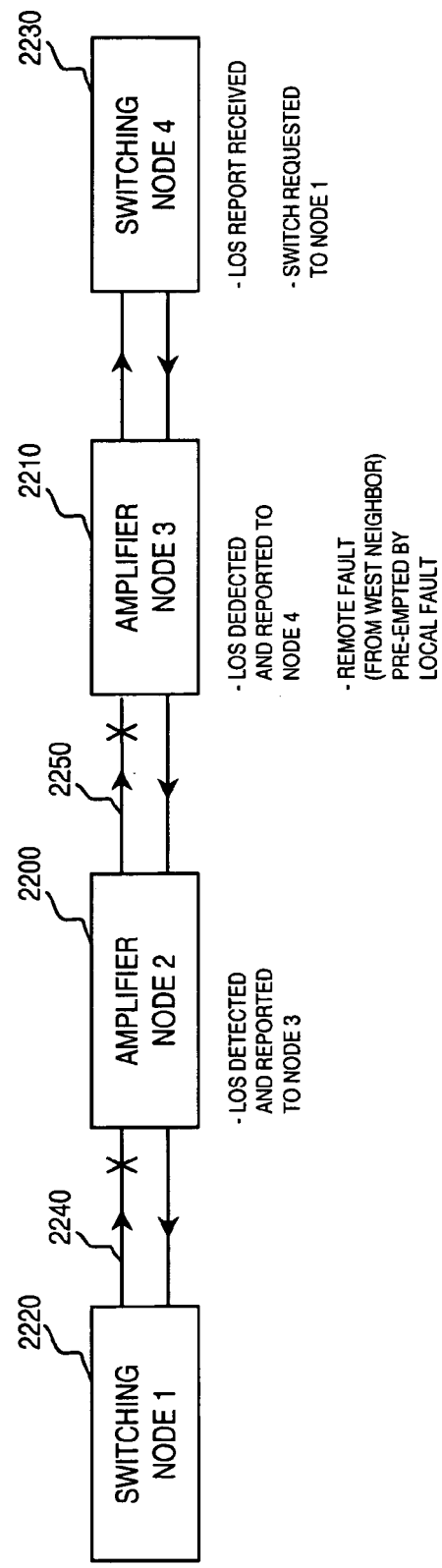

FAULT DETECTION AND ISOLATION IN AN OPTICAL NETWORK

CROSS-REFERENCES TO RELATED APPLICATIONS

This is a continuation-in-part application of U.S. patent application Ser. No. 09/648,672, Aug. 23, 2000, entitled "Fault Detection and Isolation in an Optical Network" by Kevin Hester et al., which claims the benefit of priority under 35 U.S.C. § 119 from U.S. provisional patent application Ser. No. 60/152,138, "Fault Detection And Isolation In An Optical Network," by Kevin Hester et al., filed on Aug. 24, 1999, the disclosures of which are hereby incorporated by reference in their entirety for all purposes.

BACKGROUND OF THE INVENTION

The present invention relates generally to fault detection and fault isolation in an optical network. More specifically, the present invention relates to a method and system for providing fault detection and isolation in an optical network having amplifier nodes.

Optical data networks typically include a plurality of nodes linked by optical fibers into a network. The network may be one of several common topologies, such as a linear chain network, an optical star network, or an optical ring network. Optical networks are also classified by the geographic size of the network, with wide area networks (WANs) and metropolitan area networks (MANs) being of increasing interest for providing high bandwidth network data links to and from corporations and LAN campuses, for example.

A popular optical network topology for MANs is an optical ring. As shown in FIG. 1, an optical ring network 100 typically comprises a sequence of network nodes 105, at least one primary optical fiber path 110, commonly known as "working fiber" coupling data between the nodes. Optical networks transport large flows of information such that system outages of even a few seconds can cause the loss of huge quantities of information. This is especially true for wavelength division multiplexing (WDM) and dense wavelength division multiplexing (DWDM) optical networks, which simultaneously transmit data in a plurality of optical channels, with each channel comprising a different optical wavelength.

The reliability of an optical network is an important design consideration. Optical networks can fail due to several different mechanisms. Line failure is commonly defined as a fault in the ability of light to be transmitted between nodes along a working fiber, i.e., there is no light coupled into the node because of damage to the optical fiber. Additionally, a line failure can occur at or near the interface of the fiber and a node. For example, the optical fiber may not be properly inserted into the node. Additionally, a failure of an optical interface element may be optically equivalent to a line fault if it results in a total loss of signal at all channel wavelengths to all downstream components. For example, a fault in the optical interface element receiving signals from the fiber that results in a complete loss of signal to all subsequent optical elements within the node is equivalent in effect to a fault in the fiber. An electrical equipment failure is commonly defined as a failure in one or more electrical or electro-optic modules in the node. These include optical amplifiers, multiplexors/demultiplexors, transponders, and other elements used to amplify, frequency shift, or to add or drop individual channels or bands. An electrical equipment failure may result in a loss in all channels, but may more commonly result in only a limited number of channels being dropped.

Optical networks typically employ several different approaches to permit network service to be rapidly restored in the event of a fault. Referring again to FIG. 1, optical ring networks typically include at least one protection fiber 115 between each node 105. The protection fiber 115 provides an alternate path for optical data in case the primary optical fiber 110 becomes broken or damaged along a portion of its length. Additionally, the protection fiber facilitates the routing of data to bypass a defective node 105 via a path in the protection fiber. In the case of a unidirectional path-switched ring (UPSR) the working fiber and the protection fiber commonly carry information in opposite directions, e.g., data is commonly transmitted in the working fiber in a clockwise direction and in the protection fiber in the counter-clockwise direction. Bi-directional path switched rings (BPSR) permit traffic along the ring to be carried in both directions via two or more working fibers and two or more protection fibers.

FIG. 2 is an illustrative diagram of a UPSR ring 200 operating with working and protection fiber path links intact. For the purposes of illustration, an optical data path is shown between the tributary interfaces of two nodes, NE1 and NE2. As shown in FIG. 3, in the event of a fiber break the working traffic is switched to the protection fiber in order to maintain the data link between the tributary interfaces of nodes NE1 and NE2. This is performed using optical line switching elements (not shown in FIGS. 2 and 3) within a node in order to optically switch the path of the optical signals. Note that a complete failure of one or more electrical elements within node NE1 or NE2 could also break the flow of data. Consequently, nodes NE1 and NE2 typically include redundant electrical and electro-optic elements that can be switched into use in the event that one or more electrical elements in the node fails. This is commonly known as equipment switching.

As shown in FIG. 1, a network management system (NMS) 120 is typically used to regulate the action of the nodes 105 in the event of a line failure or an equipment failure in order to restore network service. The NMS 120 typically comprises a central workstation computer receiving electrical signals corresponding to the optical strength of every optical channel transmitted through each active line of each node. The NMS 120 is typically programmed with a list of rules or procedures for handling different types of failures. Multi-channel optical-to-electrical-to-optical (OEO) detectors (not shown in FIGS. 1–3) in each node can be used to measure the signal strength of each channel entering or leaving the node. This permits the NMS 120 to determine if a channel has been dropped. If the NMS 120 determines that a channel has been dropped in a particular node, the NMS may instruct the node to perform an equipment switch of a component in the path of the dropped channel likely to have failed. The NMS 120 monitors the activity of all of the nodes, determines if a change in traffic occurs, makes a decision whether a line fault or equipment fault has occurred, isolates the fault to a particular node or fiber path, and issues appropriate commands to all of the nodes to perform one or more equipment switches or line switches to restore network traffic.

While the network management system shown in FIG. 1 improves the reliability of network 100, the inventors of the present application have recognized that it has several substantial drawbacks, particularly in regards to high performance metropolitan area networks. First, it can take a significant length of time for a central computer of a NMS 120 to determine an appropriate course of action due to the cumulative time delays of the system. There are finite response times for each OEO to measure the signal strengths of each optical channel to determine if a channel is dropped. There is also a significant propagation time for channel status signals to reach the central computer of NMS 120. This propagation time includes the time delay for short-haul Ethernet cables coupled to the node along with the time delays of the long-haul data link (e.g., a telephone line) to the central computer, which may be located several kilometers away from an individual node in network 100. There is also a time period required for the central computer to assess the state of each node and to make a decision. Still yet another time period is associated with the time delay required to transmit control signals from the central computer of NMS 120 back to each node via Ethernet and long-haul connections. There is also a time delay associated with the circuitry at the node that is used to implement a line switch or an equipment switch. In a conventional MAN system 100 the total elapsed time between the detection of a failure and a line switch or equipment switch being implemented can exceed 0.1 seconds. One industry standard that has evolved is that a communication disruption lasting more than 50 milliseconds constitutes a network outage, i.e., tributary networks receiving and transmitting data via network 100 are designed upon the assumption that optical network 100 has outages of less than 50 milliseconds. Network outages in excess of 0.1 seconds may therefore cause an irreparable loss of data to a tributary network.

Another drawback of network 100 is that the NMS 120 can be comparatively expensive to implement. The central computer is often implemented as a high performance work station, which is comparatively expensive. Another substantial cost is associated with the OEO modules used to measure channel strength in each node 105. OEO modules increase with cost as a function of the number of optical channels that they are capable of analyzing. Additionally, the cost of each OEO module tends to increase with the data capacity of each channel since faster optical and electrical components are required for high data rate channels. Advances in DWDM technology now permit thirty or more high data-rate channels to be implemented in an OEO module. This results in a corresponding increase in the cost of the OEO modules compared with first generation WDM designs having three to five moderate data-rate channels.

Another drawback of network 100 is that it may provide insufficient information to isolate electrical equipment failures for later repair. The increase in the number of channels in DWDM systems has led to multistage node designs having several stages. The stages commonly include various combinations of band pass filters, channel filters, wavelength shifters, optical amplifiers, multiplexors, and demultiplexors. Each stage, in turn, may host one channel, several channels, most of the channels, all of the channels, or frequency shifted versions of the channels, depending upon the function of the stage. A single OEO module is typically insufficient to determine the element within a node that has dropped a channel. Consequently, several OEO modules may be required for fault isolation, further increasing the cost of the system.

Furthermore, an optical fiber span between two nodes in network 100 is often too long to allow optical signals to be received within an acceptable level of confidence. Generally, the length of the optical fiber span is directly proportional to signal degradation, i.e., the greater the length of the optical fiber span, the more serious the signal degradation becomes. Consequently, one or more amplifier nodes may be added along an optical fiber span to amplify the optical signals to improve signal reception. The primary function of the amplifier nodes is simply to amplify the optical signals propagating along the optical fiber span. The use of amplifier nodes, thus, allows the length of an optical fiber span to be extended. Extending the length of an optical fiber span, however, causes at least one drawback. Since the length of the optical fiber span is increased, the time it takes for an optical signal to travel from one node to another is also increased. As a result, when a line fault involving an amplifier node occurs, the protection switch time needed to restore line traffic is increased. This increase in protection switch time may prevent a network from achieving the desired sub-50 ms protection for line traffic, thereby causing more network outages to occur.

Therefore, it would be desirable to provide an improved system and method for performing fault detection, isolation, and network restoration in an optical network having amplifier nodes.

SUMMARY OF THE INVENTION

The present invention generally comprises a fault detection and isolation system and method for optical networks. One aspect of the present invention is that a local controller in each node makes decisions on whether to activate fault restoration elements within the node, eliminating the need for a central computer to coordinate the actions of each node in response to a fault.

Generally speaking, an embodiment of an optical node of the present invention generally comprises at least one fault restoration element for restoring network traffic in response to a fault; at least one optical sensor coupled to the node for measuring a first set of optical characteristics of the optical channels coupled to the node; a signal sensor for receiving data from another device corresponding to a second set of optical characteristics of the optical channels; and a controller for adjusting the operation of said at least one restoration element as a function of said first and said second set of optical characteristics, whereby said controller determines a network fault requiring local action and directs said at least one restoration element to perform a restoration instance. In preferred embodiments the fault restoration element may include a line switcher, a redundant electrical or electro-optic element, or a combination of a line switcher and redundant electrical or electro-optic element. In one embodiment the controller is a microprocessor having a software program residing on the microprocessor that includes a problem list for correlating the occurrence of potential faults from the first and second set of optical characteristics. In a preferred embodiment the signal sensor is a transceiver for communicating channel status messages with a neighboring node via an optical channel.

Broadly speaking, the present invention also includes methods of fault detection and isolation. One embodiment is for an optical network having a plurality of optical nodes, each node including at least one local optical sensor for measuring optical characteristics of the datastream at the local node, at least one transceiver for communicating data to each neighboring node that it is coupled to via a fiber optic link, and each node having a local controller for controlling at least one local restoration element, the method comprising the steps of: sensing a set of optical characteristics of the datastream at each node; updating a channel map of active channels at each node of the optical network; and communicating the updated channel map to the nodes via the fiber optic link; wherein each local controller compares the optical characteristics measured at the local node to the channel map to determine if a fault has occurred requiring that the local controller activate a restoration element.

The method of the present invention may be practiced with nodes having fault restoration elements that include line switchers, redundant electrical or electro-optic elements, and combinations thereof. In one embodiment the method of fault detection and isolation is for a node of an optical network having a datastream with a plurality of optical channels, the network including a plurality of nodes coupled to each neighboring node, each node having at least one local optical sensor, each node having at least one optical transceiver for communicating status reports to each neighboring node that it is optically coupled to, and each node having a local controller for controlling a local line switcher residing in the node, the method comprising the steps of: sensing a loss in signal from a neighboring node via the local optical sensor; monitoring the transceiver to determine if the neighboring node is communicating status reports to the node; and initiating a line switch to redirect traffic to an alternate optical path to restore data traffic if there is a loss in signal from the neighboring node and status reports are not being receiving from the neighboring node. In another embodiment the method of fault detection and isolation is for a node of an optical network having an optical datastream with a plurality of channels, the network including a plurality of nodes optically coupled to each neighboring node, each node having at least one local optical sensor, at least one transceiver for communicating data to each neighboring node that it is coupled to, and a local controller for controlling redundant elements residing in the node, the method comprising the steps of: sensing a first set of optical characteristics of the optical channels traversing the node; receiving status reports that include a second set of optical characteristics of the optical channels measured by at least one sensor in another node of the network; comparing the first and second set of optical characteristics; determining if one or more optical channels are being dropped in the node; and initiating an equipment switch in the local node to restore the dropped traffic.

According to another exemplary embodiment of the present invention, one or more amplifier nodes are coupled between two switching nodes. Each amplifier node is capable of detecting a fault condition, such as a loss-of-signal (LOS) condition, on an incoming line. Upon detecting the LOS condition, the amplifier node generates a fault report which is then forwarded to a switching node. The switching node uses information from the fault report to initiate switching actions, if any, to restore traffic. According to another exemplary embodiment of the present invention, each amplifier node is configured to receive a fault report received from another amplifier node and forward such fault report to a switching node. Based on the locally detected fault conditions and the fault reports received from neighbor amplifier nodes (if any), each amplifier node selects the highest priority fault and sends it to the downstream switching node.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIGS. 10A and 10B are portions of an exemplary decision table used to detect and isolate faults in a ring network;

FIG. 18 is a schematic diagram illustrating a situation in which a line fault occurs between two amplifier nodes;

FIG. 19 is a schematic diagram illustrating a situation in which line faults occur between two switching nodes;

FIG. 21 is a schematic diagram illustrating a situation in which two line faults occur in one direction between two switching nodes having two amplifier nodes located therebetween;

FIG. 22 is a schematic diagram illustrating a situation in which two line faults in the same direction are prioritized by an amplifier node in accordance with the present invention;

DETAILED DESCRIPTION OF THE INVENTION

The figures depict a preferred embodiment of the present invention for purposes of illustration only. One of skill in the art will readily recognize from the following discussion that alternative embodiments of the structures and methods disclosed herein may be employed without departing from the principles of the claimed invention.

Figure 1:
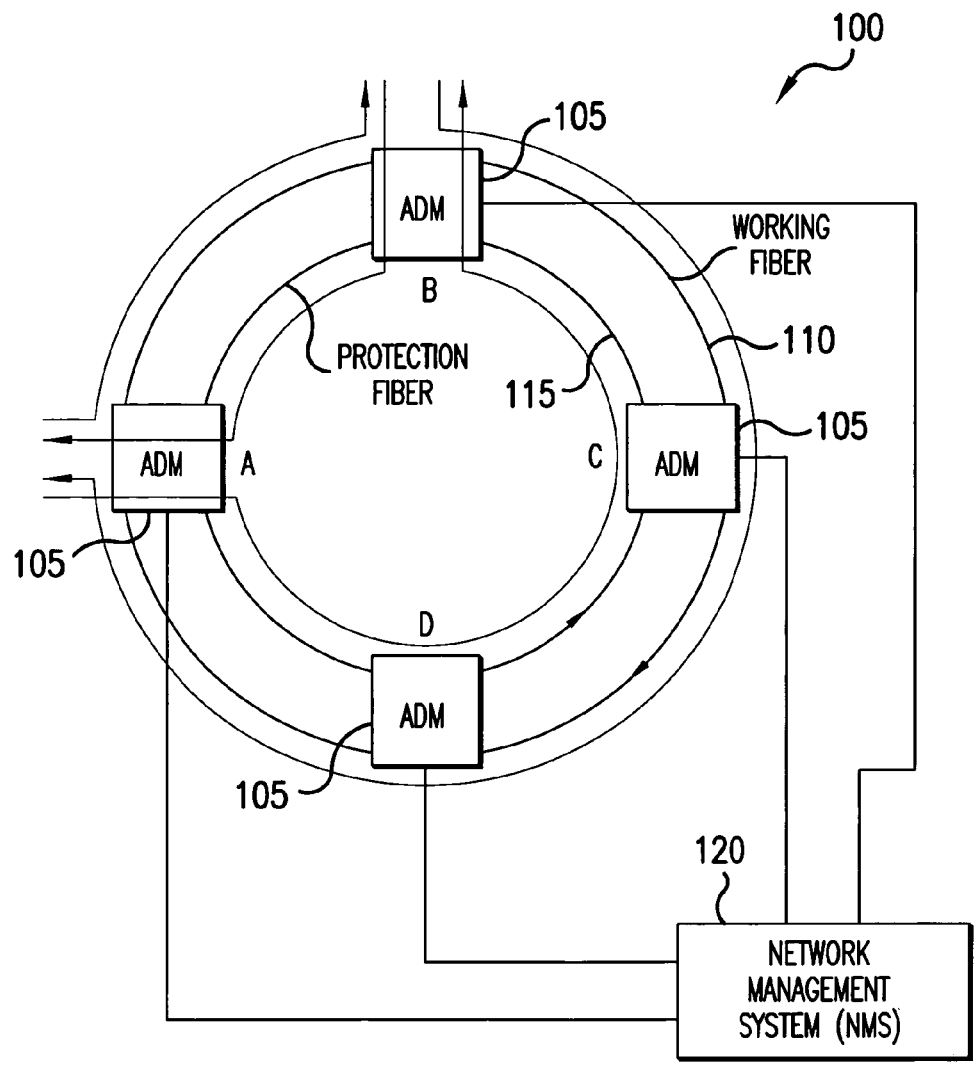
FIG. 1 is a block diagram of a prior art optical network having a central network management system for detecting faults and restoring network traffic.
Figure 2:
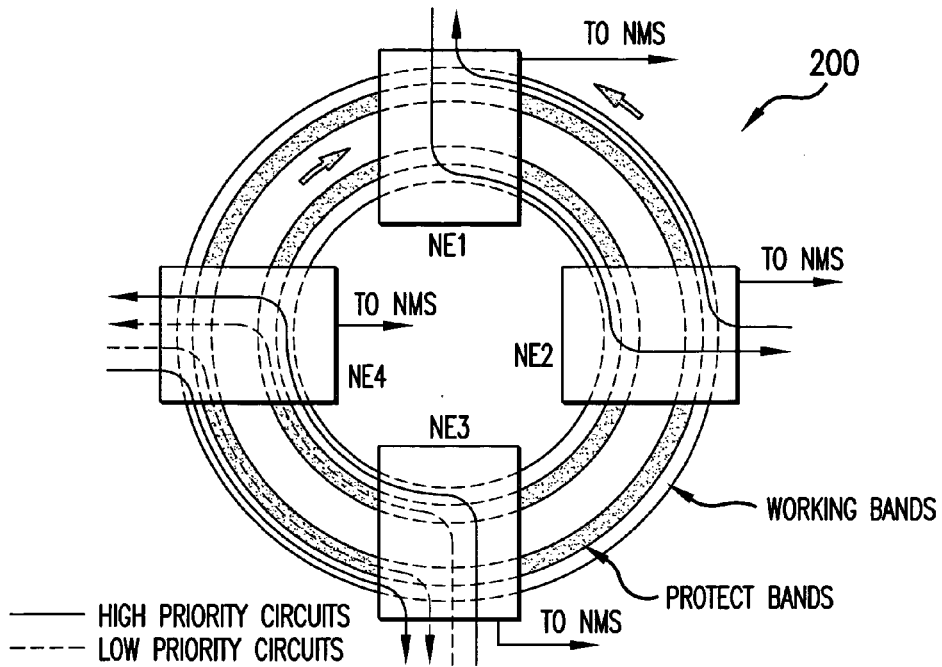
FIG. 2 is a block diagram of a prior art optical ring network having a central network management system controlling traffic between working fibers and protection fibers.
Figure 3:
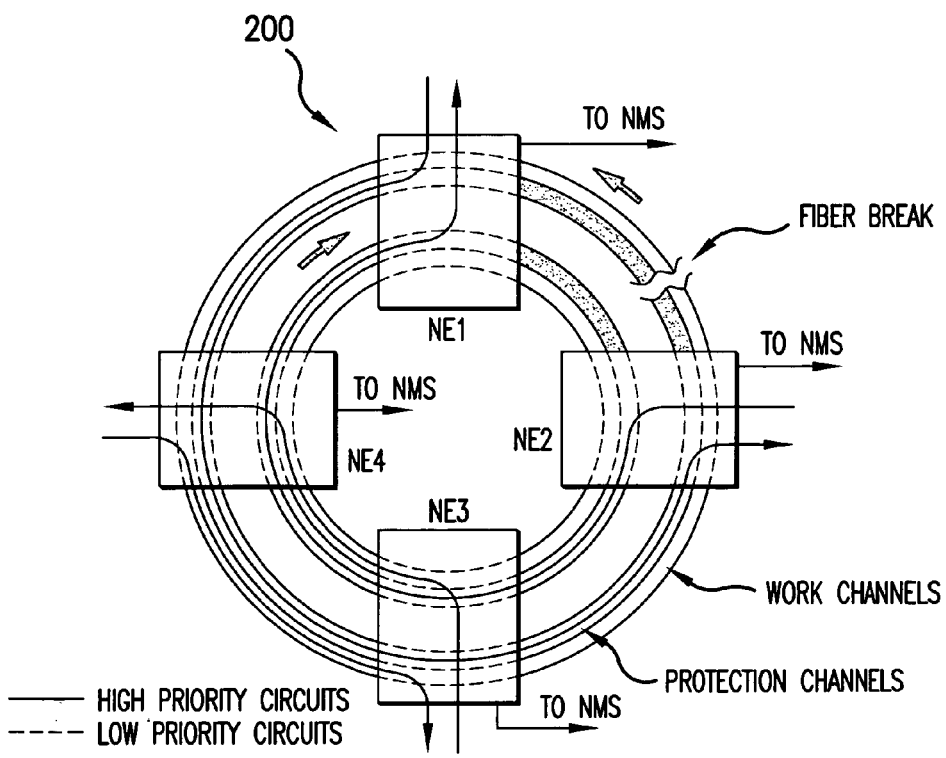
FIG. 3 is a prior art block diagram of the network of FIG. 2 showing how the central network management system redirects traffic in response to a line fault.
Figure 4:
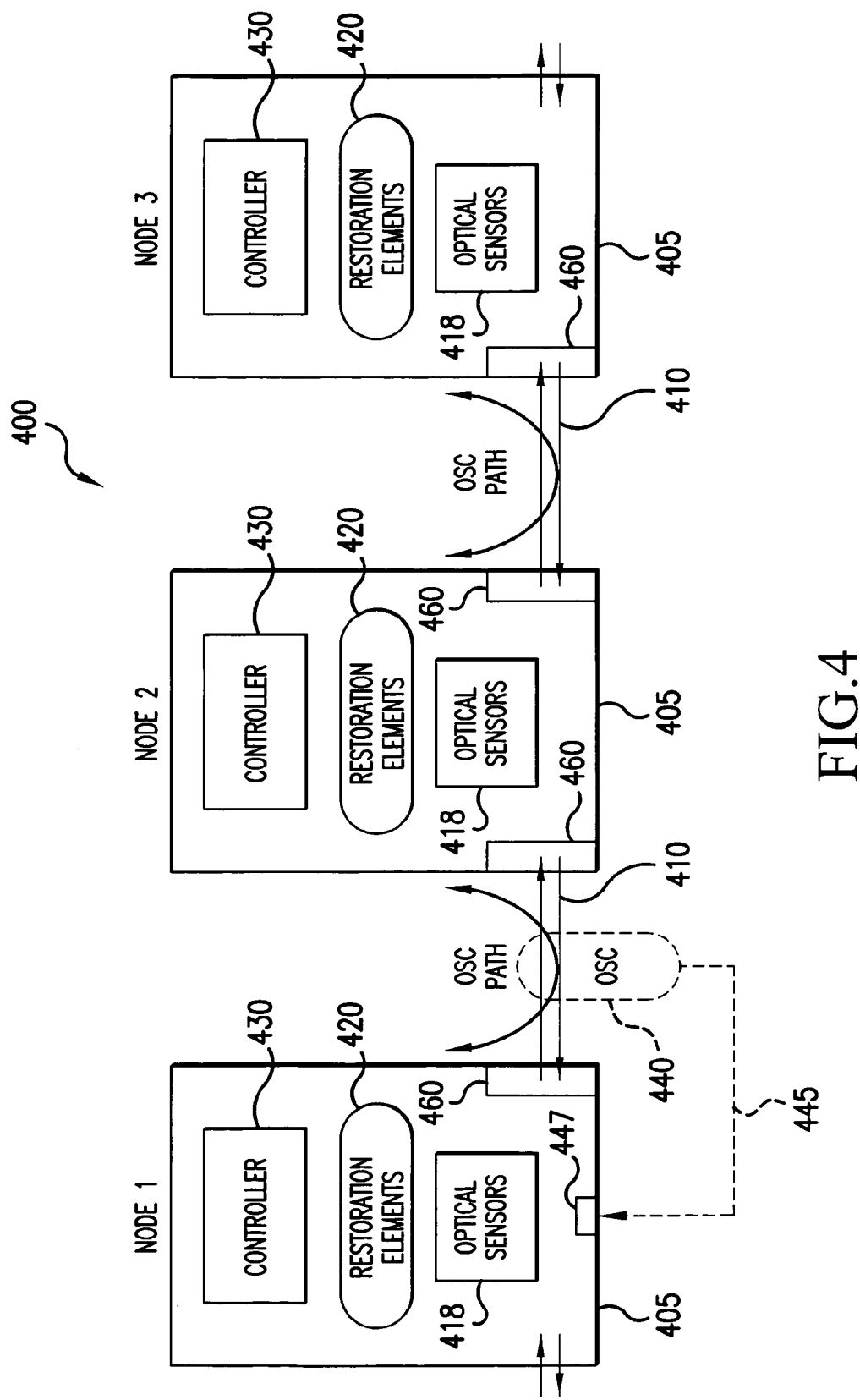
FIG. 4 is a block diagram of an embodiment of optical network in accordance with the present invention.

FIG. 4 is a block diagram of a portion of an optical network 400 illustrating some of the general principles of the present invention. For the purposes of illustration many conventional elements used in optical networks are omitted. It will also be understood that optical network 400 may be part of a larger chain, branched chain, mesh, or ring network. A plurality of network optical nodes 405 are shown coupled by fiber spans 410. The fiber spans 410 may comprise one or more optical fiber lines that include all of the potential optical channel data links between neighboring nodes for communicating an optical datastream. For the purposes of illustration, the optical paths in the fiber lines are shown by arrows, although it will be understood that the drawing is not to scale and that each arrow corresponds to at least one fiber coupled to corresponding optical ports 460 at each node. As described below in more detail, in a preferred embodiment node 405 has a plurality of ports arranged to a line switcher that may be used to redirect the optical data stream to an alternate output port in the even of a line fault. For example a fiber span 410 may comprise a working fiber line and a protection fiber line each coupled to a node by respective ports. In a preferred embodiment for wavelength division multiplexing, each fiber line comprises a single spatial-mode optical fiber capable of transmitting a plurality of optical wavelengths.

Each node 405 includes its own local restoration elements 420 to restore network service in the event of a fault that could disrupt network traffic. The restoration elements 420 preferably include a line switcher responsive to a line switch command to re-direct traffic away from a faulty line of a span 410 and onto an alternate line by selecting an alternate optical pathway between two ports of the node, i.e. changing the port from which the data stream exits the node such that the datastream is redirected onto an alternate line. The restoration elements also preferably include redundant electrical or electro-optic elements responsive to an equipment switch command to maintain network traffic in the event of a failure of an electrical or electro-optic component. Examples of redundant electro-optic elements include but are not limited to: redundant band pass filters, redundant channel filters, redundant multiplexors, redundant demultiplexors, redundant optical detectors, redundant optical amplifiers, or redundant transponders. It will be understood that while there is at least one fault restoration element 420, various combinations of fault restorations elements may be included depending upon the particular application. Each node has its own local controller 430 that determines if a fault has occurred and that regulates the actions of the restoration elements 420 within the node.

An individual controller 430 may use several different sources of information to make a decision whether to activate the restoration elements 420 of its node. First, each node 405 includes at least one internal optical sensor 418 for measuring a first set of optical characteristics of the optical channels at the node. The first set of optical characteristics corresponds to information on channel activity that may be determined by the optical sensors at the local node, such as information regarding a complete loss of signal (LOS) in a single channel, a band of channels, or all the channels, depending upon the resolution of the sensor and the number of channels received by the sensor. The optical sensor 418 may be part of a pre-amplification or post-amplification component of the node. Additionally, each node 405 may also include other internal elements, such as p-I-n photodiodes, configured to provide information on the signal strength of individual channels or bands of channels. P-I-N photodiodes are a type of photodetector that has a lightly doped intrinsic semiconductor sandwiched between p-type and n-type semiconductors. However, optical sensors, such as p-I-n detectors, that are not otherwise required to perform a necessary node function (e.g., multiplexing or demultiplexing) increase the cost of network 400 and introduce extra signal loss that must be compensated for with optical amplifiers. Consequently, it is desirable to use optical sensors required for other functions to provide information on the characteristics of the optical channels. For example, some types of transponders include an inherent sensing capability that may be used to provide information on the characteristics of the optical channels (e.g., the presence of optical power in a channel received by the transponder). The required resolution of an optical sensor 418 depends upon whether the sensor is coupled to a single channel, band of channels (e.g., three channels), or to all of the channels. Conventional p-I-n optical detectors commonly have sufficient resolution to measure the loss of a single channel from a band having a small number of channels (e.g., a band having three to five channels), but commonly lack sufficient resolution to determine if a single channel has been dropped from a large number of channels, such as when thirty optical channels are coupled to a p-I-n detector.

Second, in a preferred embodiment each node receives information from at least one other element, such as an upstream element in a unidirectional path switched response (UPSR) optical ring. This information from the upstream element assists the node to determine if individual channels or bands of channels have been dropped (lost) prior to entering the node. In a preferred embodiment, each node receives status information from upstream nodes from an optical supervisory channel (OSC) communicated by the optical span. This status information preferably includes the information that at least one upstream controller has measured or otherwise collected regarding the status of the network channels. The status information may include a second set of characteristics for the channels upstream of the node along with other network status information. The second set of optical characteristics may, for example, include information on channel activity measured at the upstream node. Additionally, the second set of optical characteristics may also include a channel map of channel activity of a plurality of nodes. For example, referring to FIG. 4, node 2 may record a set of characteristics for the optical channels traversing node 2 using its own optical sensors and transmit this information to node 1 via the OSC. Node 2 may, for example, communicate to node 1 that it is receiving optical signals (e.g., from node 3) or that some of its transponders or other optical detectors have experienced a loss of power in one or more channels or bands of channels. Additionally, node 2 may relay to node 1 messages that include network status information that is has received from other nodes. For example, the messages transmitted via the OSC channel may, for example, include a channel map of active channels that is updated and forwarded at each node as it is passed along to downstream nodes. Additionally, the OSC channel may be used by a node to transmit status and alert messages that are also forwarded to other nodes of the network.

The OSC channel also permits the nodes to communicate messages on planned restoration events to each other, thereby permitting the nodes to coordinate their actions. For example, node 2 may send a signal announcing to its neighbors that it is about to initiate an equipment switch that will cause a short disruption in traffic through node 2. This information will alert node 1 to not interpret a short disruption in upstream traffic as a line fault. Additionally, the OSC channel permits the nodes to share information on the results of a restoration event. For example, if node 2 initiates an equipment switch that is unsuccessful in restoring network traffic then node 2 can communicate this information to the other nodes as a failed restoration instance message. This may provide information to another node that enables that node to determine if an equipment switch is necessary at that node. This so-called "rolling equipment switch" mode of restoration is made possible by each node sharing data on the results of an equipment switch with its neighbors. The OSC channel thus provides a means for the nodes to communicate a variety of status information, including channel status and coordination information.

In an alternate embodiment, an optical analyzer 440, such as an optical spectrum analyzer (OSA) may be used to measure information on the channel activity and communicate it to a node 405. This information may include information on the number of optical channels transmitted along the fiber to the optical analyzer. Additionally, other information may also be recorded, such as information on channel width (Hz) or other information indicative of a failure of a laser, amplifier, or electro-optic component in a network node. As shown in FIG. 4, the OSA 440 may be electrically coupled via electrical connections 445 to a signal sensor 447 of a downstream node if the OSA is disposed a comparatively short distance from the node. However, if the OSA is located a substantial distance upstream of the node it may be desirable to communicatively couple the OSA to the downstream node using an optical data channel of the fiber span, i.e. an optical sensor 418 is used to perform the function of the signal sensor.

One advantage of optical network 400 is that each node 405 benefits from the optical channel information of other devices, particularly upstream nodes. This means that an individual node 405 requires comparatively fewer internal optical sensors (e.g., P-I-N photodetectors) in order to have the capability to detect and isolate an equipment fault. Additionally, each individual node 405 receives information from its neighboring nodes that allows it to determine if a line fault has occurred between it and its neighboring node, thus enabling the node to make a decision whether a line switch is appropriate.

Another benefit of network 400 is that it eliminates the need for centralized control of network restoration. Node controller 430 may be implemented as a comparatively low cost control module. For example, node controller 430 may be a local computer, microcomputer, microprocessor, microcontroller, or dedicated circuit configured to control the actions of the restoration elements within the node that it resides. In a preferred embodiment, node controller 430 is a comparatively inexpensive microprocessor programmed to act as a local computer that controls the actions of the restoration elements 420 within the node that it resides.

The use of a local controller 430 at each optical node 405 results in fast response times compared to a conventional centralized NMS system 100. There are currently two important restoration time standards in the industry for a maximum acceptable interruption in network traffic. These restoration time standards correspond to a fifty millisecond standard and also a one hundred millisecond standard developed by BELLCORE. Estimates by the inventors indicate that a metropolitan area network having a ring topology constructed in accord with the teachings of the present invention can restore line faults in a time period less than either common industry standard, i.e., less than either one hundred milliseconds or fifty milliseconds. This is in contrast to a conventional optical network 100 having a central NMS 120, which may require up to one second to restore traffic after a line failure in a metropolitan area network.

Figure 5:
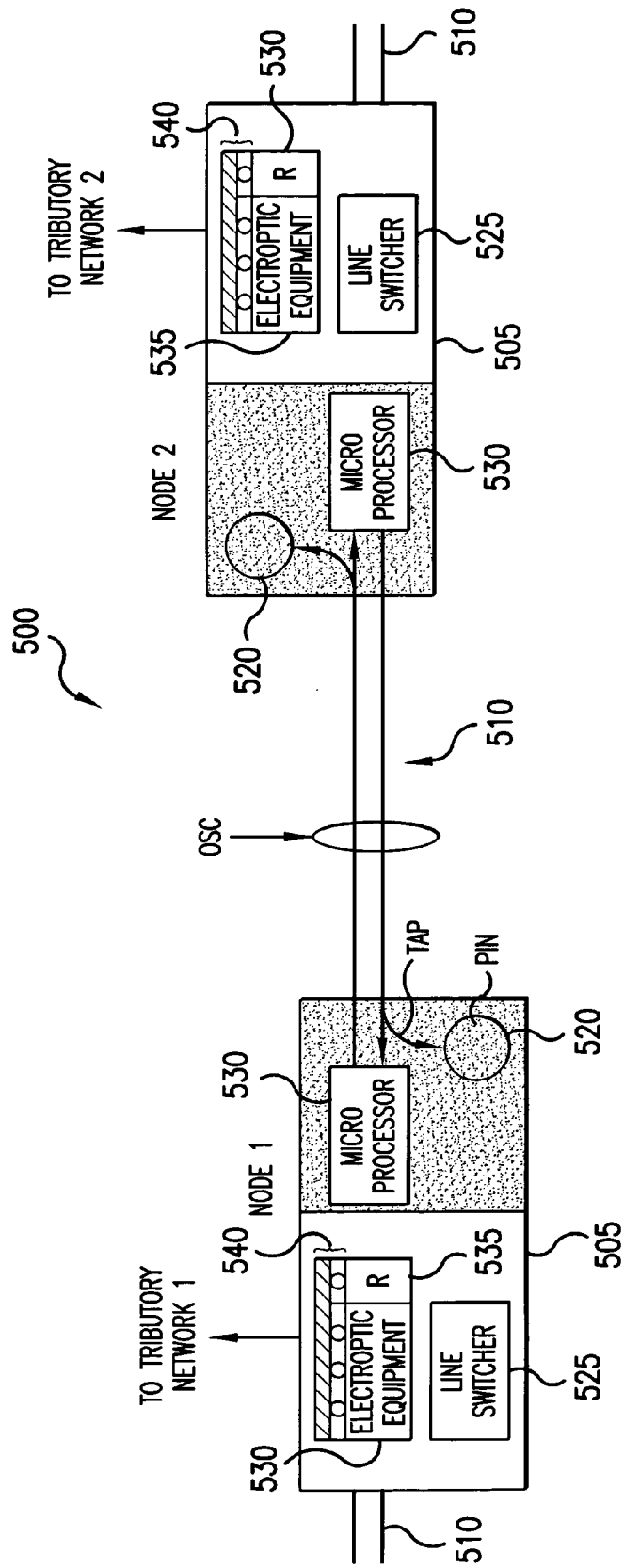
FIG. 5 is a block diagram of an embodiment of an optical network in accordance with the present invention.
Figure 6:
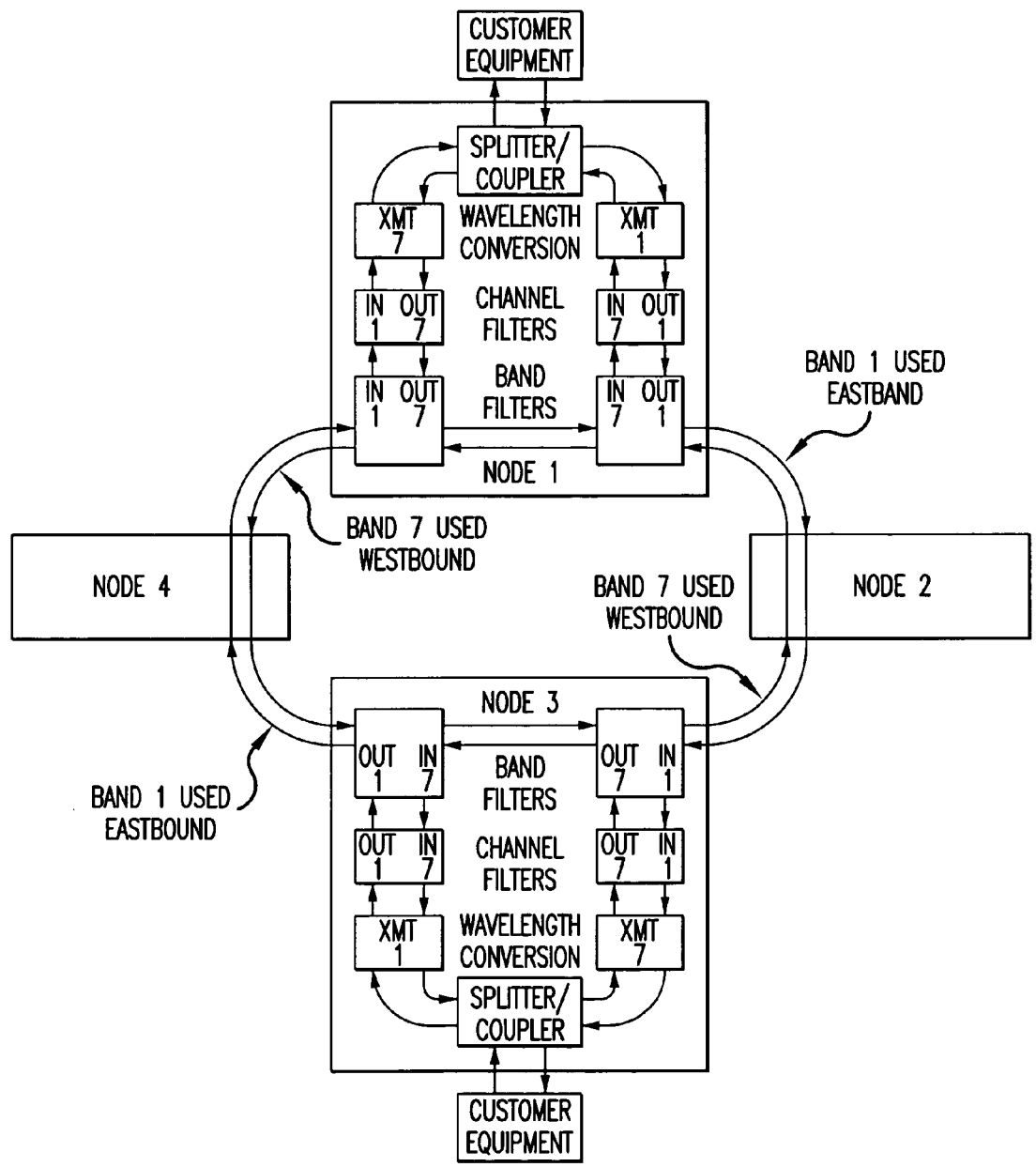
FIG. 6 is a block diagram showing a preferred arrangement of multiplexing/demultiplexing elements within the nodes of a wavelength division multiplexing optical network in accordance with the present invention.

FIG. 5 is block diagram of a generalized representation of two neighboring nodes of an optical network 500 coupled by an optical span 510. As shown in FIG. 5, an optical signal sensor 520 (e.g., a P-I-N photodetector) is used to convert the OSC optical channel into an electrical signal (i.e., optical to electrical conversion of the OSC channel). The OSC channel is preferably tapped off using an optical filter or demultiplexor disposed in a line card element. A microprocessor controller 530 is preferably used to host a fault detection and isolation computer program at each node. The fault detection and isolation program correlates available information on optical channel characteristics in the node with status information received from neighboring nodes to detect changes in channel activity indicative of a line fault or equipment fault in the node. The program preferably includes a decision table or algorithm to determine if a line switch or equipment switch is required. As shown in FIG. 5, a line switcher 525 is preferably included to redirect optical traffic to the port of an alternate optical line in the event of a line failure. A wavelength division multiplexing (WDM) optical network typically includes electro-optic elements 530 such as multiplexors, demultiplexors, and optical filters. A set of redundant electro-optical elements 535, R, is preferably also included to permit an equipment switch. Each node may also include a transponder 540 to convert the channels into an optical frequency or format appropriate for a tributary network coupled to the node. In some cases the transponder includes optical power level capability, i.e., the frequency or format conversion performed by the transponder inherently involves determining that the channel is active. FIG. 6 is a block diagram illustrating a preferred arrangement of band filters, channel filters, and wavelength conversion transponders for an optical ring network. For the purposes of illustration, the line switcher, controller, and redundant elements are not shown in FIG. 6.

Figure 7:
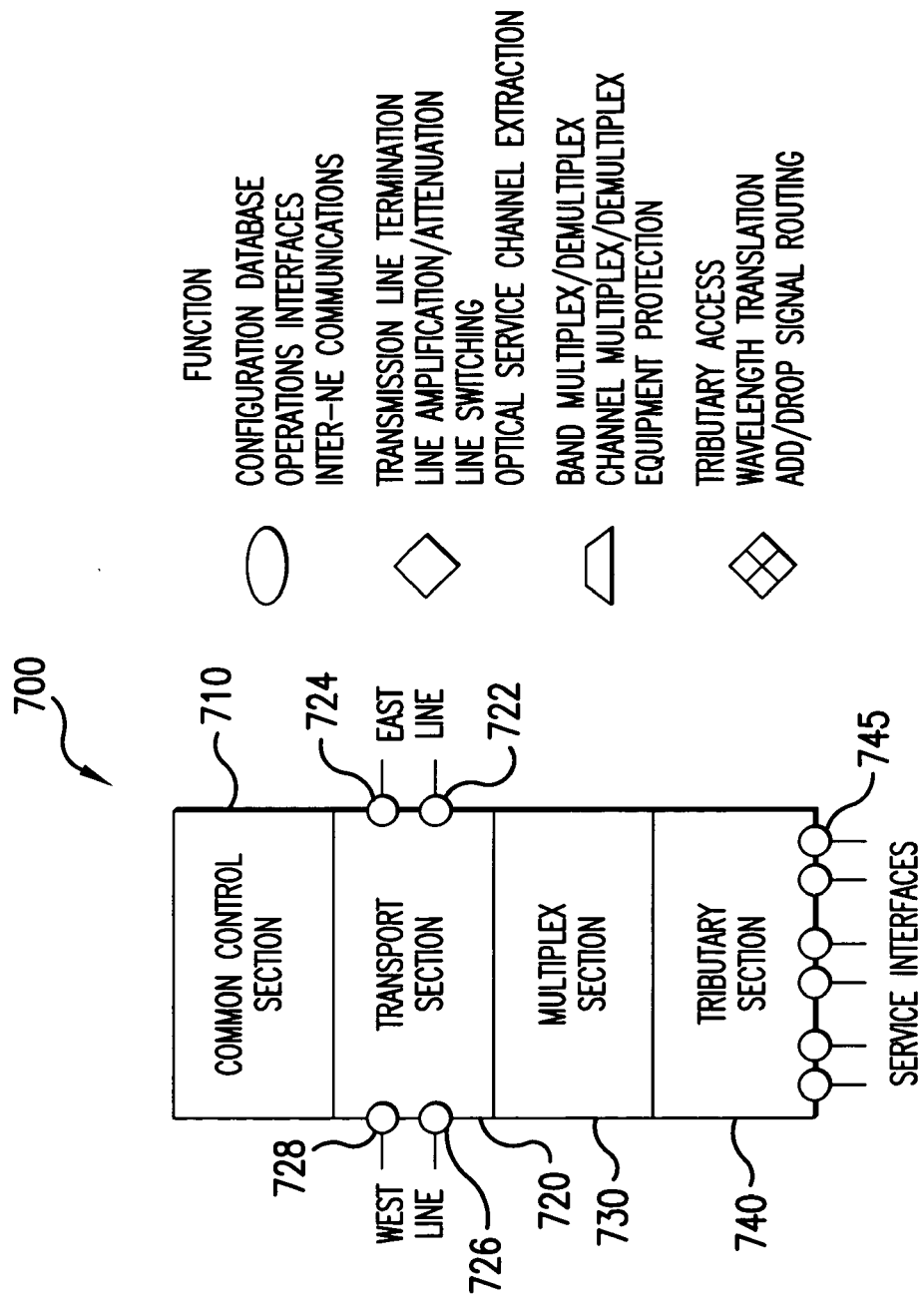
FIG. 7 is a functional block diagram showing a preferred node arrangement in accordance with the present invention.

FIG. 7 is a block diagram of a preferred node structure 700 for an optical ring network. The functional attributes of each block are also shown. It will be understood that many variations on the structural and functional relationship of node 700 are encompassed by the present invention.

As shown in FIG. 7, in a preferred node structure 700 a control section 710 includes a configuration database, operational interfaces, and software modules for inter-node communications via OSC channels. The common control section provides software administration and control of the node and preferably includes a PC compatible processor element module and persistent storage module. The processor element module preferably runs an Embedded WINDOWS NT operating system.

The transport section 720 includes elements for line amplification, a line switcher, measuring the OSC signal, and transmitting or terminating (if desired) a line. The transport section 720 is configured to receive four ports corresponding to two West-line ports and two East-line ports, in accord with standard terminology in UPSR and BLSR rings that a first span comprising a working fiber and a protection fiber are coupled via two ports 722, 724 to one side of transport section 720 whereas a second span including another working fiber and protection fiber are coupled via ports 726, 728 to the other side of transport section 720. The transport section terminates the spans between nodes. It divides the received optical signal into working, protection, and un-switched band groups and provides protection switching in BLSR and UPSR systems. It preferably includes an optical amplifier such as an Erbium doped fiber amplifier to boost optical DWDM transmission levels.

The multiplex section 730 includes electro-optic elements for performing wavelength division multiplexing operations and has redundant elements for equipment protection. The multiplex section 730 is preferably implemented as a two-stage optical multiplexor that aggregates signals from the tributary section 740 into the line side DWDM format and splits received line-side signals into the individual channels used by the tributary section. The first multiplex stage combines the individual channels launched by the tributary transponder wavelength converter interfaces (WCIs) into three-channel wide bands. Each band is preferably fed into the aggregated line-side signal by a band wavelength division multiplexor (BWDM) in the second stage. The BWDMs multiplex (add) and demultiplex (drop) groups of three wavelengths for further subdivision by channel wavelength division multiplexors (CWDM)s. The CWDM modules multiplex a set of three outgoing wavelengths into a band and demultiplex the corresponding incoming band of wavelengths into three individual channels. CWDMs also switch traffic between the primary BWDM CP backup BWDM modules in redundant applications. In a protection switching configuration, a signal carried on a working band is restored by switching it to the equivalent protect band on the other fiber.

The tributary section 740 includes transponders (WCIs) for wavelength translation, tributary network ports 745, and has add/drop signal routing capability. The tributary section is the point of connection for client optical signals and it converts the line side DWDM frequencies into short reach signals, such as 850 nm and 1310 nm signals. Each WCI of the tributary section has two transmitter-receiver pairs: one for the client-side signals and the other facing the multiplex section and operating a specific DWDM frequency. Between these is an electrical cross-connect capable of routing signals between the tributary and line side transceivers.

Figure 8:
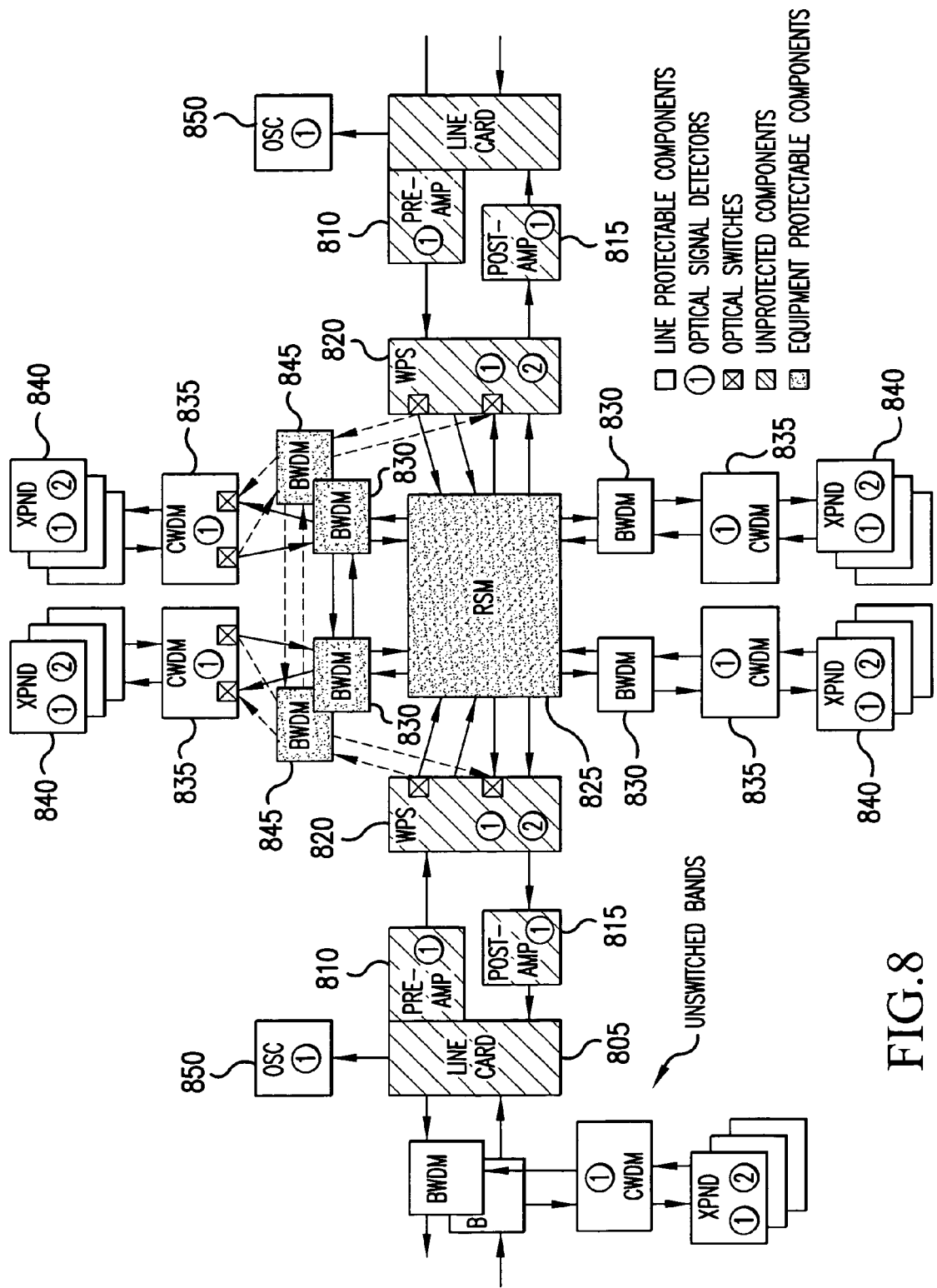
FIG. 8 is a block diagram of a preferred embodiment of the node of FIG. 7.

FIG. 8 shows a block diagram of a portion of preferred embodiment of a WDM node for optical rings. Referring to both FIGS. 7 and 8, the transport section generally comprises line cards 805, optical pre-amps 810 and post amps 815, working protect splitter (WPS) section 820, ring switch module (RSM) 825 for performing a line switch. The WPS section 820 preferably is configured to permit working and protect traffic to be demultiplexed. During normal operation (i.e., all fiber lines functional) it is desirable to have the option to transmit data, such as lower priority data, on the protection fibers (i.e., use both the working and protect fibers). WPS section 820 permits data on both working and protection lines to be demultiplexed during normal operation. Additionally, optical switches are also shown in the WPS section 820 for switching light via the RSM 825. The multiplex section generally comprises band wavelength division multiplexing (BWDM) sections 830 and channel wavelength multiplex division multiplexing (CWDM) sections 835. The transponders 840 (XPND), also known as wavelength converter interfaces (WCIs), correspond to a portion of the tributary sections. There are redundant BWDM sections 845. The overlapping BWDM and XPND sections illustrate redundant components. Optical switches are included in the CWDM modules to permit a switch to the redundant BWDM modules.

A preferred arrangement of optical detectors is also shown. The pre-amp and post-amplification elements include an inherent ability to determine if they are receiving optical power. Similarly, the XPND units include an inherent optical signal detection capability. Optical detectors are preferably also included in the WPS and CWDM modules. In the preferred embodiment the BWDM modules do not include optical detectors. The transceiver 850 for receiving OSC signals also includes an optical sensor capability.

Figure 9:
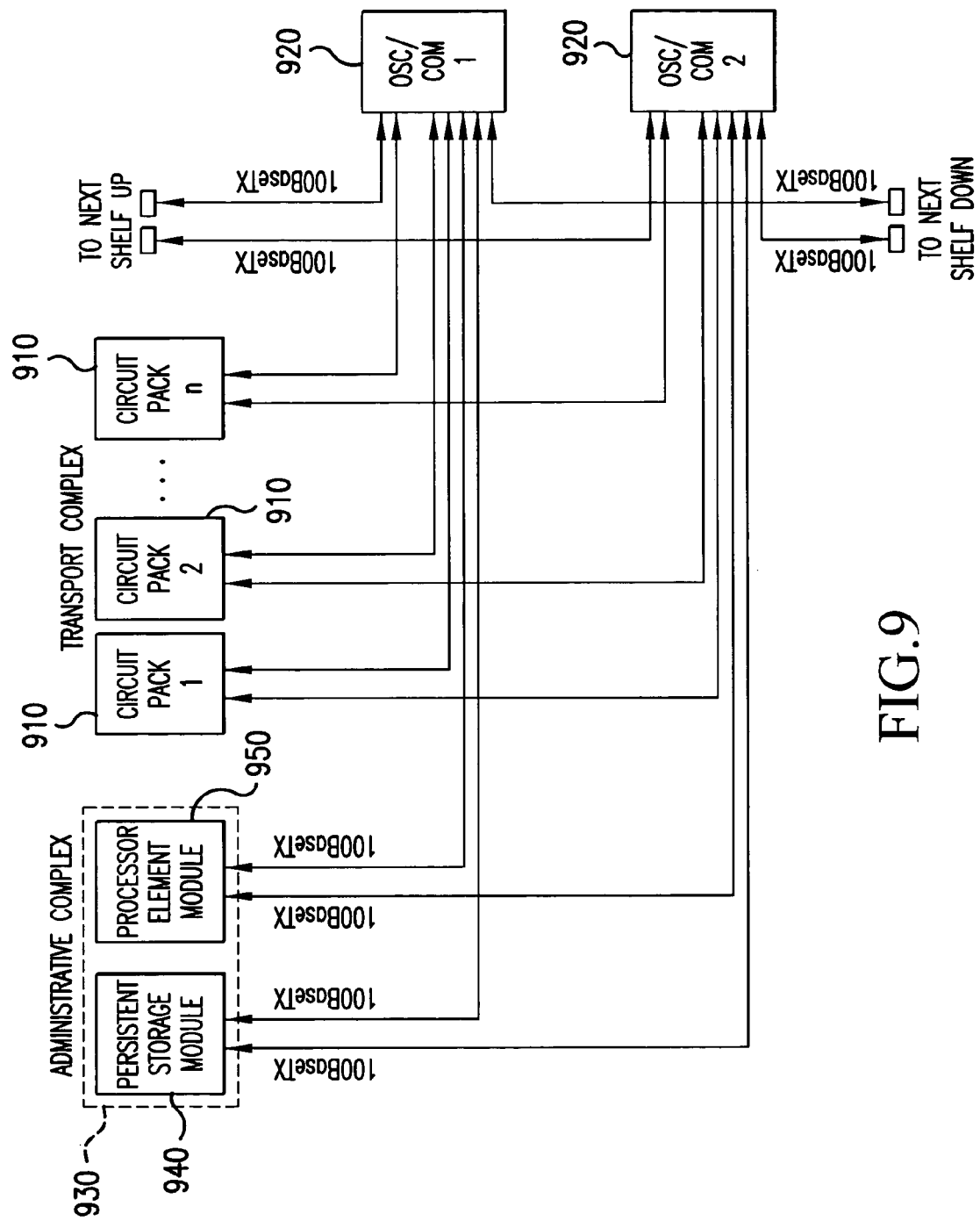
FIG. 9 shows an embodiment having node components arranged on field replaceable circuit packs communicatively coupled to processor and memory modules.

A node for dense wavelength division multiplexing (DWDM) may carry a large number of different wavelengths, with each wavelength corresponding to one channel. Consequently, the physical implementation of a DWDM node 400, 500, 700 800 may require a plurality of CWDMs, BWDMs and XPNDs. The components are preferably arranged on a plurality of field-replaceable circuit packs coupled by short optical jumper links to facilitate a field engineer making rapid field repairs of failed components by swapping circuit packs. FIG. 9 is a block diagram of a partial view of node with field replaceable circuit packs showing a plurality of circuit packs 910 coupled by a local Ethernet connection to at least one OSC/COM module 920. The OSC/COM 920 module contains circuitry for inter-node communication via the OSC channel. The OSC channel may communicate data in a variety of data formats used in digital networks, such as TCP/IP, Ethernet, or ATM format. The OSC links may be configured to form a neighboring node data link. Alternately, data packets may contain address information (e.g., data frames) for transferring data further along the network. Additionally, the OSC/COM module 920 preferably includes circuitry for coordinating the communication of each circuit pack 910 to an administrative complex 930 corresponding to a microprocessor 940 and memory storage module 950. The OSC/COM module also preferably receives signals from each circuit pack indicative of problems with the circuit pack, such as a loss of electrical power to the circuit pack or internal self-diagnostic signals from the circuit pack (e.g., an abnormal electrical characteristic indicative of a failed component or a signal form an optical detector residing on the circuit pack).

It will be understood that a software program for performing fault detection and isolation may have slightly different algorithms depending upon the arrangement of optical elements within each node, the number and arrangement of optical sensors for measuring the optical characteristics of the channels within a node, and the number of elements, such as transponders, capable of providing an output indicative of channel activity. In the most general case a network engineer would analyze the node design and the network topology to produce a "problem list" of likely problems for each signal indicating a possible loss of a signal channel, plurality of channels, loss of a band, loss of a plurality of bands, or loss of all channels within the node.

Each problem entry in the problem list may have an associated entry describing additional information from other nodes that can be correlated (compared) with the local loss of signal in order to isolate the problem to one or more likely causes. However, in some cases there may be insufficient information to uniquely isolate the problem to a single cause. In this case, the node may attempt a local solution (e.g., a line switch or an equipment switch) that is the most likely to restore traffic. If the restoration event does not result in a restoration of the dropped channel(s), then this failure may be reported to other nodes (e.g., a list of faulty components published) in order to assist those nodes to make an appropriate equipment switch or line switch. As an illustrative example, a first node may build a list of potentially failed components within the first node based upon information from a channel map (a list of active channels at various locations in the network) distributed through the OSC and the dropped channel(s) observed by sensors coupled to the first node. The first node may then attempt an equipment switch of one or more of the components in the its problem list of potentially failed components. If the equipment switch does not restore the dropped traffic (i.e., restore the dropped channel(s)) the node forwards a summary of the failed equipment switch event that may assist other nodes to detect and isolate the problem. For example, the summary of the failed equipment switch event may include a list of dropped channel(s), the components in the first node suspected of having failed, and the result of the equipment switch (e.g., which of the dropped channels the equipment switch did not restore). An upstream node may, in turn, have a problem list that includes an entry in its problem list instructing the upstream node to initiate an equipment switch in response to several criteria, including initiating an equipment switch if it receives a report that the first node noticed a dropped channel(s) that an equipment switch in the downstream node did not restore. It will be understood that the problem list in the upstream node may also include other criteria for initiating an equipment switch used in combination with the summary of the failed equipment switch, e.g., the problem list of the upstream node may recommend an equipment switch be initiated in the upstream node for the situation that the upstream node receives the summary of a failed equipment switch from the downstream node and one or more other abnormal conditions are detected at the upstream node.

The problem list can be created for a particular node design and arrangement of photodetectors that associates a list of potential problems for various changes in channel status. For each fault listed in the problem list, there is a set of rules for isolating the problem and selecting an appropriate restoration response. This information is preferably encoded as part of a fault detection and isolation program residing on the controller. The fault detection and isolation program correlates system faults and initiates an appropriate restoration action, such as a line switch or an equipment switch. The fault detection and isolation program preferably includes a wavelength management monitor that maintains a list of wavelengths in the network and the status of each channel with respect to source and destination nodes. Status change events are preferably communicated to neighboring (peer) nodes via the OSC. This permits each node to acquire a map of the network topology (e.g., a ring map for a ring network), a channel table of active channels, and to send or receive path change signals (e.g., send or receive information to neighboring nodes notifying the neighboring node of a line switch event). Thus, each controller keeps a dynamic model of all of the connections to the node, the network topology, the signal paths, and the channel status. The fault isolation program also preferably monitors the optical sensors (e.g., the photodectors in the BWDMs and WPSs), the transponders (WCIs), the OSC channel, and any other photodetectors of the node that may provide information that can be correlated with a fault. The fault correlation program also preferably includes a switch engine that is configured to generate a switch event packet that is forwarded to neighboring nodes via the OSC in order to alert neighboring nodes that a switch event is about to happen. Additionally, the fault correlation program preferably notifies other nodes (e.g., neighboring upstream nodes) if a local equipment switch has failed, thereby providing the other nodes with status information that can be used to make equipment switch decisions.

Table 1 is an illustrative problem list showing signal loss conditions, their likely causes, and suggested fault isolation response. As can be seen in Table 1, information received from the OSC channel assists the controller of the local node in making equipment switch decisions

TABLE 1

Illustrative Problem List For An Optical Network

| Node Condition | Likely Causes | Fault Isolation Response |
| --- | --- | --- |
| No OSC signal Received at OSC detector | 1) Line failure to neighboring node; or 2) Failure of local OSC detector | 1) Initiate line switch if there is also no optical power at input buffer. 2) Institute "OSC detector failure report" if optical power at input buffer. |
| No Power At Input Buffer | 1) Line failure between upstream neighboring node, or 2) Line failure upstream of neighboring node. | 1) If no OSC signal, initiate ring switch; or 2) If OSC signal present, do not initiate ring switch. |
| No Power at One Transponder | 1) Failure of transponder; 2) Dropped channel in node; 3) Dropped channel upstream; or 4) Channel not presently in operation. | If upstream node reports activity in channel activate equipment switch to elements in node along path of transponder. If problem not solved, report failure to other nodes. |
| No Power of all CWDMs Linked to a Common BWDM | 1) Failure of BWDM; 2) Failure of multiple CWDMs; or 3) Loss of channels upstream. | If upstream nodes do not report a loss of power in affected channels, initiate an equipment switch of BWDM. |

Figure 10A-2:
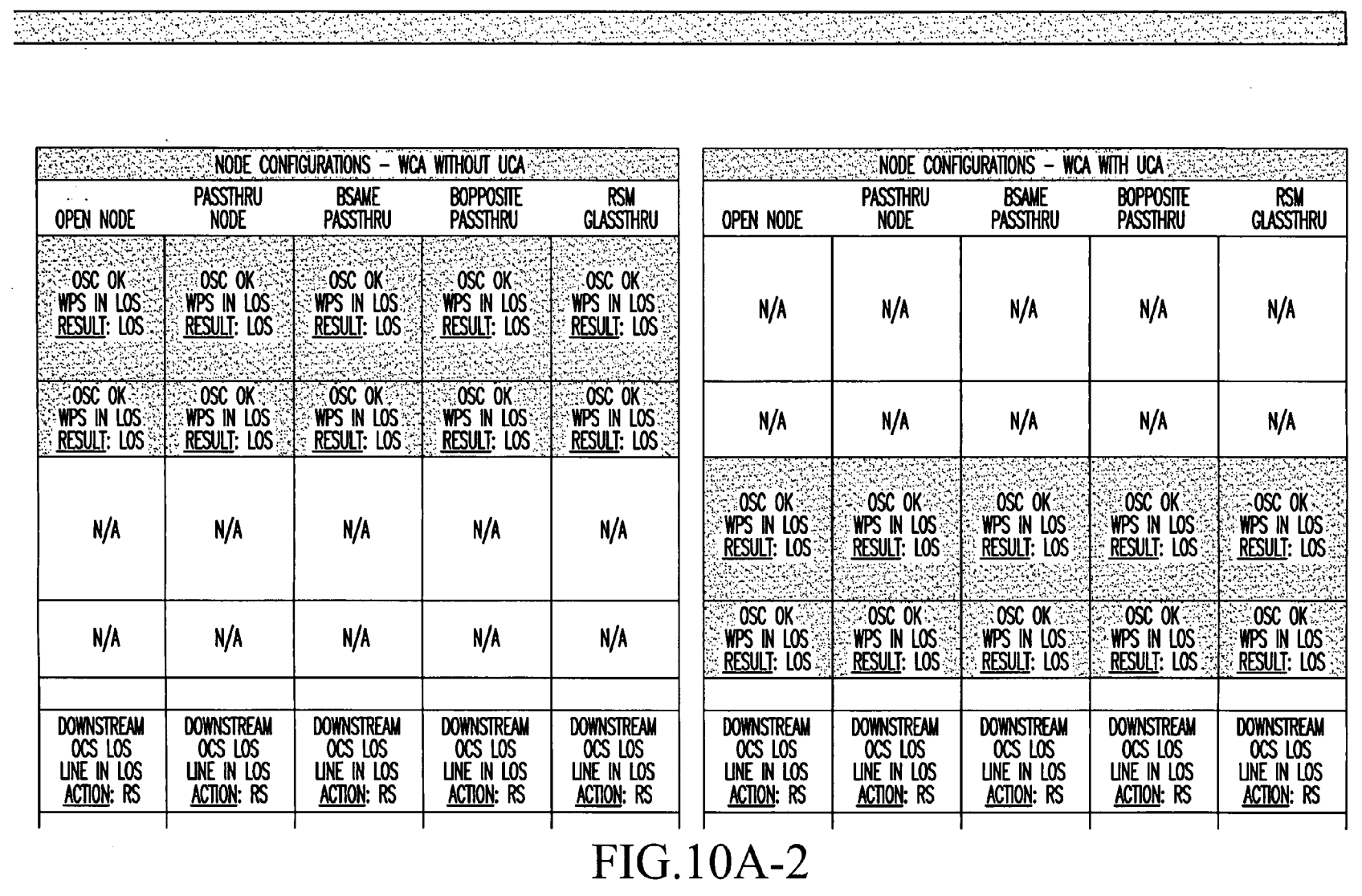
Figure 10B:
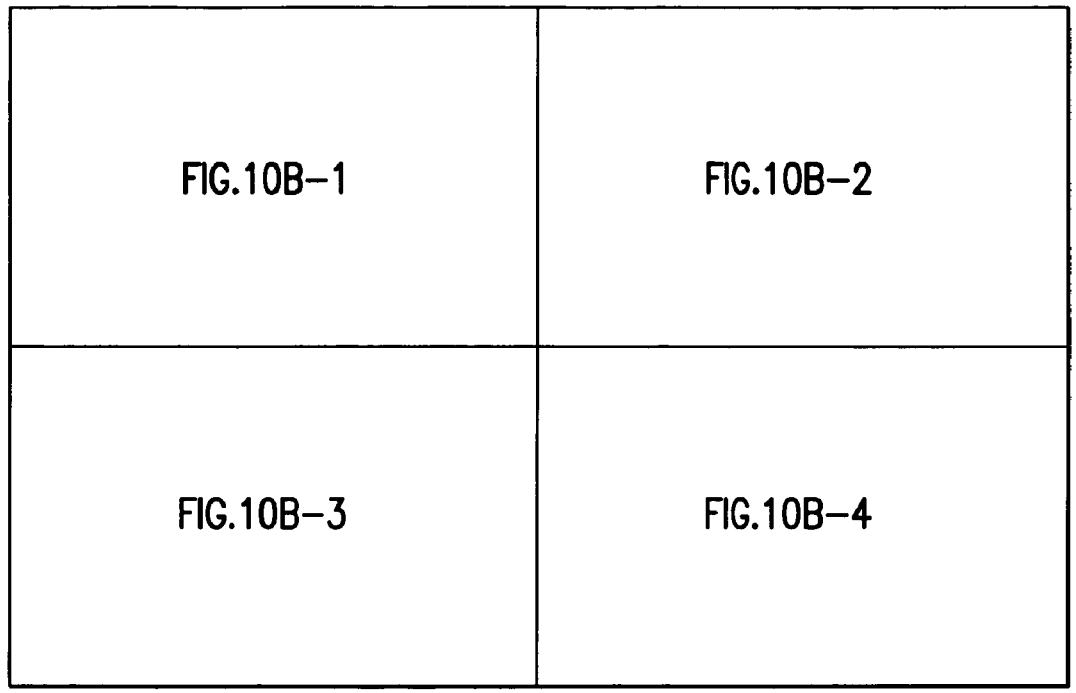

It will be understood that the problem list will depend upon the network topology and node design. FIGS. 10A and 10B are respective portions of a decision table for a preferred embodiment of the invention for use in an optical ring network. The problem list for typical metropolitan area networks requires comparatively little local memory and computing power, thus facilitating the use of a local controller 430 that is implemented as one or more comparatively low cost microprocessors.

Referring again to FIG. 8, it will be noted that some problems are more easily determined than others, depending upon the path of the optical channels through the node relative to the stages in the multiplexor section and on the tributary stage. For example, several transponders are typically coupled to one CWDM. Consequently, a loss in optical output of all of the transponders 840 coupled to a single CWDM may indicate a failure of the CWDM. However, a loss in optical output of only some of the transponders coupled to the CWDM indicates that a failure of the CWDM is less likely. Similarly, a failure of all of the CWDMs coupled to a BWDM is likely to be caused by a failure of the BWDM, although a failure of a BWDM in another node is also a possibility.

Figure 11:
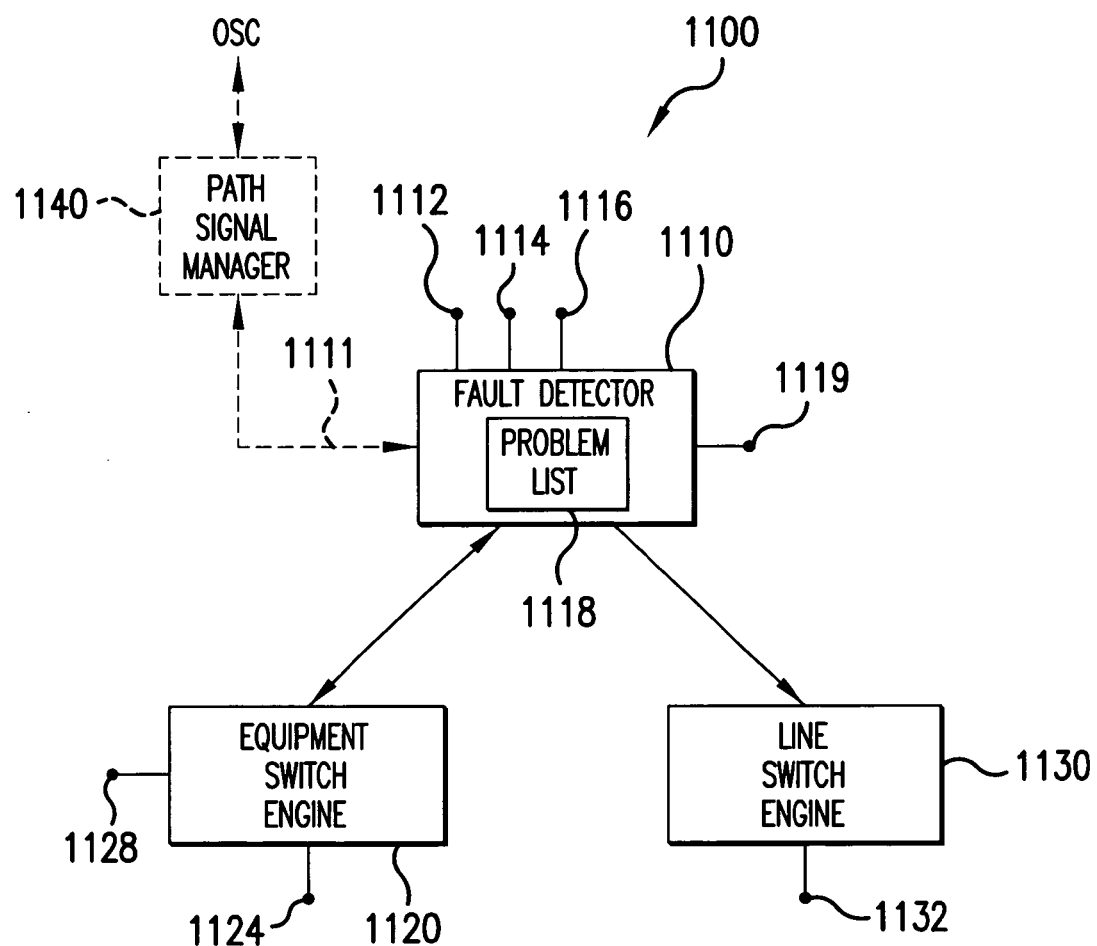
FIG. 11 is a functional block diagram of a fault detection and isolation controller system in accordance with the present invention.

FIG. 11 is a functional block diagram of a preferred fault detection and isolation system 1100 for implementing the fault detection and isolation function of a local controller 430. The system 1100 preferably includes a fault detector 1110, an equipment switch engine 1120, and a line switch engine 1130. A path signal manager 1140 (shown in phantom) is preferably coupled to software program 1100. Fault detector 1110, equipment switch engine 1120, and line switch engine 1130 are preferably implemented as software modules of a common software program residing in controller 430. However, it will also be understood that fault detector 1110, equipment switch engine 1120, and line switch engine 1130 may be implemented on separate electrical components (e.g., separate dedicated circuits or microcontrollers) or reside as software modules on separate microprocessors that are electrically coupled together.

Path signal manager 1140 provides fault detector 1100 with information corresponding to a channel map, i.e., an updated list of all channels that are provisioned at various node locations along the optical network. The path signal manager 1140 is preferably implemented as a software module that resides on the local controller 430 and which receives channel map updates via the OSC channel. However, it will be understood that some of the functionality of path signal manager 1140 may reside in a central monitoring system (not shown in FIG. 11) that accumulates data received from each network node and which publishes channel maps to all of the nodes of the optical network.

The fault detector 1110 is preferably programmed with information corresponding to a problem list 1118, such as a problem list similar to those of FIGS. 10A and 10B, for correlating faults and deciding if an equipment switch or a line switch should be initiated. Fault detector 1110 receives one or more input signals, such as an input signal 1112 from each transponder (WCI) indicating a loss of signal to the WCI port, one or more input signals 1114 corresponding to loss of signal (LOS) from other optical sensors and optical detectors coupled to the local node, and an input signal 1116 corresponding to a circuit pack failure (e.g., an improper electrical connection to one or more of the circuit packs shown in FIG. 9). The fault detector also has a signal input 1111 corresponding to information received from path signal manager 1140. Fault detector 1110 also communicates data on channel activity with path signal manager 1140. Additionally, fault detector 1110 may also have a separate status report output 1119 for broadcasting status reports to other nodes.

The line switch engine 1130 initiates a line switch if it receives trigger signals generated by the fault detector 1110 instructing the line switch engine 1130 to perform a line switch to an alternate optical fiber path. As previously described, the problem list 1118 of fault detector 1110 is preferably programmed such that the fault detector 1110 instructs line switch engine 1130 to initiate a line switch only if there is a loss of signal in both the line-card (e.g., the pre-amp to the node) and the OSC channel. Line switch engine 1130 preferably has a line switch notification output 1132 that informs interested subsystems (e.g., the fault detector within the node and systems in other nodes) that a line switch is complete. A switch engine 1130 that initiates a line switch in response to a trigger signal may be implemented using a variety of conventional line switch engine techniques. For example, switch techniques for optical ring networks are described in U.S. Pat. No. 5,986,783, "Method and apparatus for operation, protection, and restoration of heterogeneous optical communication networks," and U.S. Pat. No. 6,046,833, "Method and apparatus for operation, protection, and restoration of heterogeneous optical networks." The contents of U.S. Pat. Nos. 5,986,783 and 6,046,833 are hereby incorporated by reference in their entirety.

Equipment switch engine 1120 is coupled to fault detector 1110 and initiates an equipment switch when it receives a trigger signal from fault detector 1110. Additionally, equipment switch engine 1120 preferably includes a manual equipment switch input signal 1128. Input signal 1128 is preferably configured to permit a manual equipment switch to be initiated by a field engineer at a local node or by a network administrator. Manual equipment switches are useful to facilitate preventive maintenance or upgrades of node components. Equipment switch engine 1120 may also include a notification signal 1120 communicated to fault detector 1110 and broadcast to other nodes (via the OSC) indicating that the equipment switch is completed.

Figure 12:
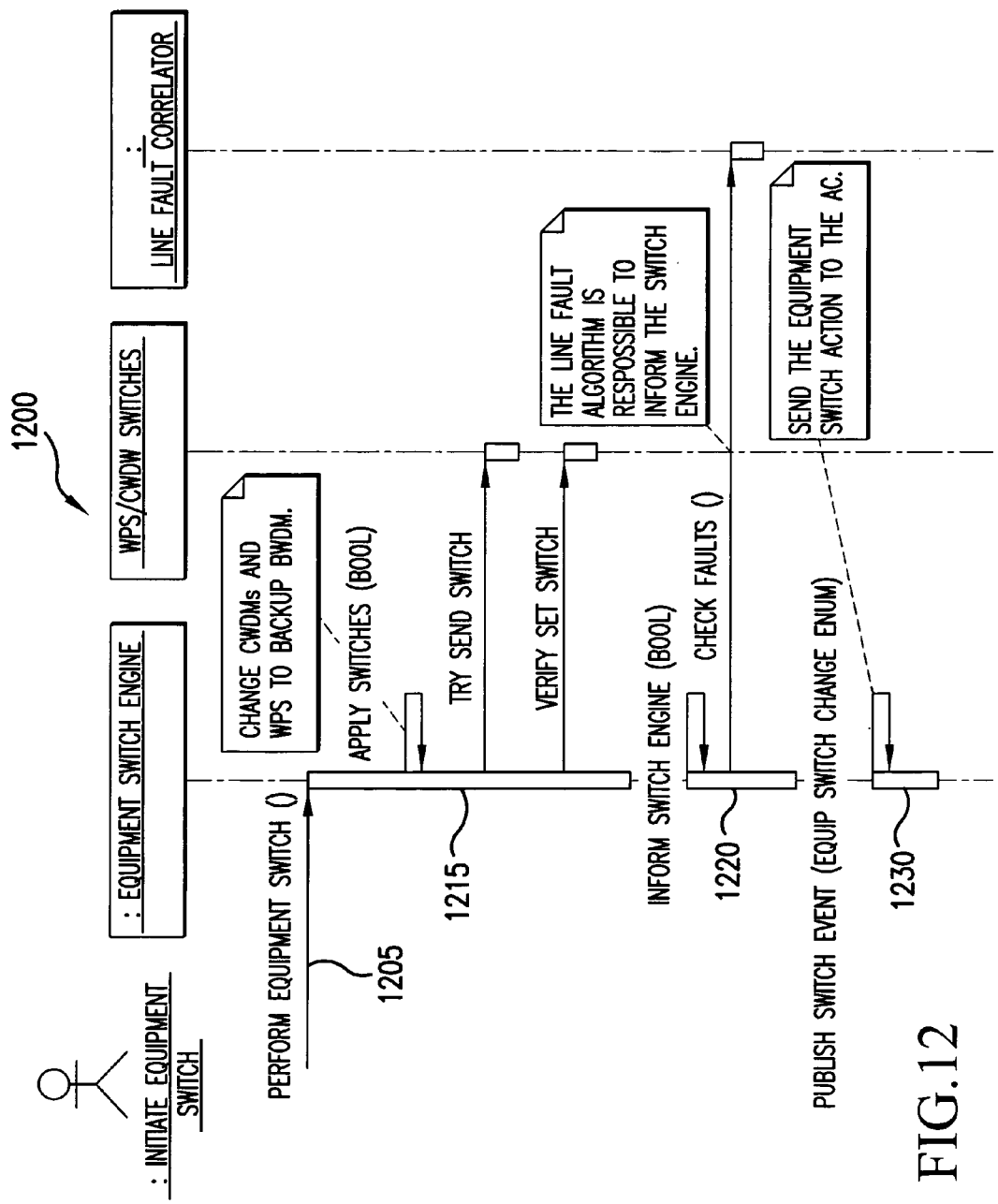
FIG. 12 is an interaction diagram showing a preferred sequence of steps for initiating an equipment switch instance.

FIG. 12 is an interaction diagram 1200 showing a preferred sequence of interactions for performing an equipment switch using equipment switch engine 1120. Fault detector 1110 instructs equipment switch engine 1120 to perform an equipment switch 1205. Equipment switch engine 1120 issues a sequence of switch commands to switch to redundant back-up components (e.g., WPS/CWDM switches) using a sequence of switch protocols 1215. The equipment switch engine 1110 then notifies the fault detector 1110 that an equipment switch has occurred 1220, which prompts fault detector 1110 to test if the fault was corrected by the equipment switch. If the results of the equipment switch are a failure, the results of the equipment switch may be published, 1230.

Figure 13:
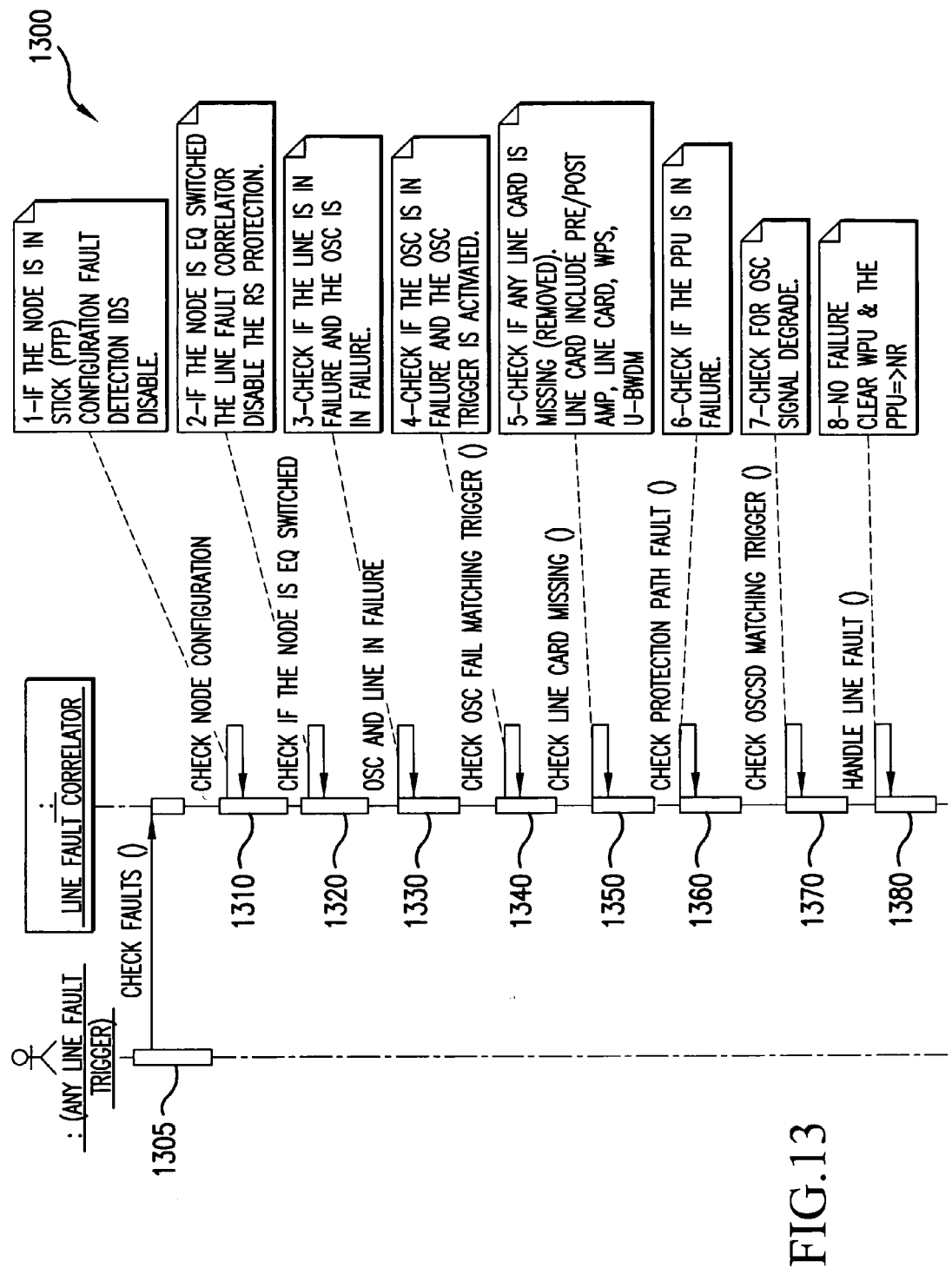
FIG. 13 is an interaction diagram showing a preferred sequence of steps for initiating a line switch instance.

FIG. 13 is an interaction diagram showing a preferred sequence of steps for performing a line switch. A line switch causes a short interruption in network traffic. Consequently, it is desirable for the fault detector 1110 to perform a sequence of steps that are intended to minimize the number of unnecessary line switches. As shown in FIG. 13, the fault detector 1110 continuously receives signal inputs related to potential faults 1305. If the fault detector 1110 observes an event that may be a line fault the fault detector 1110 performs a step 1320 to see if the node is in the process of being equipment switched and disables the line switch if an equipment switch in progress. In step 1330 fault detector 1110 then confirms that there is no received input power and no signal in the OSC channel. In step 1340 fault detector 1110 may also verify that the OSC signal detector is not disabled. In step 1350 fault detector 1110 then checks to see if circuit pack card is missing. In step 1360 fault detector 1110 may then check to see if the protection path is operable. The fault detector may then test to see if the OSC signal has degraded, as shown in 1370, prior to the step of triggering a line switch 1380.

For an arbitrary arrangement of optical components in a node 700, 800 the channels that are supposed to be coupled through each block element may be labeled, permitting, for example, a graph, tree, or table to be prepared showing a list of components in the local node or upstream nodes which could have failed to account for a loss of specific channels in the local node. A corresponding list of other local node and neighbor conditions for each element in the list may also be generated to further limit the list of components likely to have failed, based upon the information available from the nodes and other information that a field technician can later acquire using conventional field analysis techniques. The microprocessor and persistent memory preferably retains a history of the detected events and response to the fault. This information is preferably made available (e.g., via a display) to a field engineer along with a list of components likely to have failed and additional action items to confirm which component failed. This information can be in the form of a simple audio visual display (e.g., one or more light emitting diodes or a liquid crystal display) or may be in the form of a numeric code accessible by the field engineer. Alternately, the information can be presented in the form of a tutorial to guide a field engineer through the steps of an isolation tree. For example tutorial could be presented via a monitor (e.g., a liquid crystal display monitor) coupled to the local node or via a portable computer coupled to the node.

Referring again to FIG. 4, in an alternate embodiment each node may receive information on channel activity from an OSA 440. The use of OSAs 440 increases the cost of the network. However, a benefit of using OSAs is that each node 405 may receive accurate information from the OSA on the channel activity upstream or downstream of the node. A problem list for an embodiment utilizing OSAs 440 would include information coupled to a node 440 by one or more OSAs. In particular, a benefit of using an OSA 440 is that it permits the channel activity of all of the channels to be measured upstream or downstream of a node. This permits an equipment fault to be isolated to a particular node, i.e., to the node where a particular channel or band of channels is dropped. Additionally, the information from an OSA 440 permits the effectiveness of an equipment switch to be determined by a node 405. For example, an OSA 440 downstream of a node may be used to collect information regarding whether an equipment switch instance restored traffic in one or more dropped channels.

Figure 14:
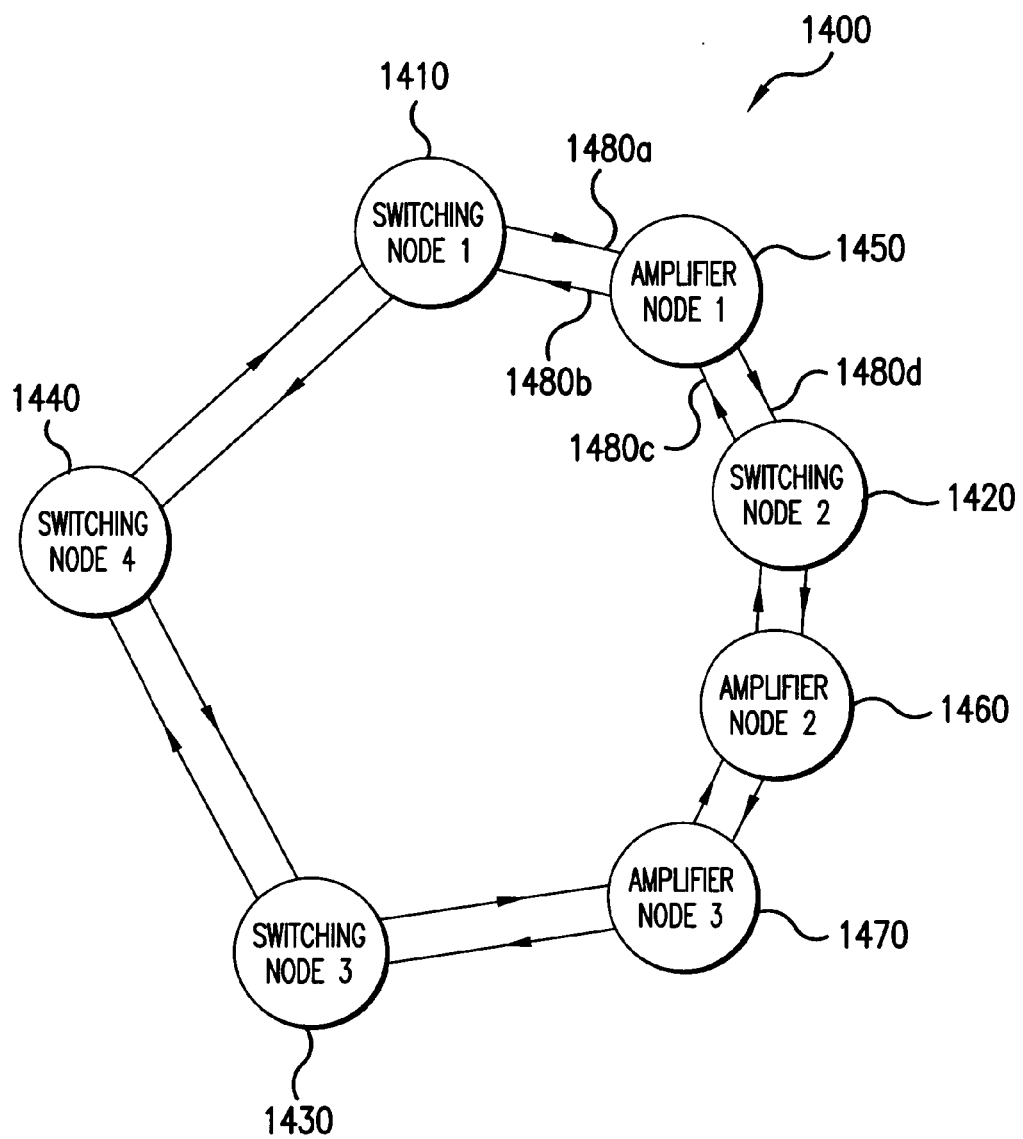
FIG. 14 is a schematic diagram illustrating a bi-directional line switched ring (BLSR) network having both switching nodes and amplifier nodes.

Furthermore, according to an exemplary embodiment of the present invention, each node which is capable of performing traffic switching may also receive network fault status information from an amplifier node. FIG. 14 is a schematic diagram illustrating an exemplary bi-directional line switched ring (BLSR) network having both switching nodes and amplifier nodes. Referring to FIG. 14, the BLSR network 1400 has a number of switching nodes 1410, 1420, 1430 and 1440 and a number of amplifier nodes 1450, 1460 and 1470. As shown in FIG. 14, one or more amplifier nodes may be located between a pair of switching nodes. For example, the amplifier node 1450 is located between the switching nodes 1410 and 1420 and the amplifier nodes 1460 and 1470 are located between the switching nodes 1420 and 1430. While the embodiments of the present invention are shown in conjunction with a BLSR network for purposes of illustration, it will be clear to one of ordinary skill in the art that the present invention is generally applicable to any network in which amplifier nodes are implemented.

A switching node is capable of performing, among other things, traffic switching. When a line fault occurs, the switching nodes communicate with one another via exchange of switch requests to ensure that the appropriate traffic switching is performed. An amplifier node, on the other hand, does not perform any traffic switching. Instead, an amplifier node, in addition to amplifying the signals traveling between two adjacent switching nodes, monitors the conditions of a line and reports any problems to a downstream switching node to allow the downstream switching node to initiate any appropriate switching actions. The functions of the amplifier node will be further described below.

From a topology perspective, the switching nodes and the amplifier nodes are two different types of nodes. As far as switching signaling is concerned, the switching nodes behave the same way with or without the amplifier nodes, i.e., a switching node can only send a switch request to another switching node to initiate traffic switching. In other words, when it comes to traffic switching, the amplifier nodes are transparent to the switching nodes. This transparency allows for easy network upgrades. The amplifier nodes can be added or removed from the network without interfering with the overall network topology.

Figure 15:
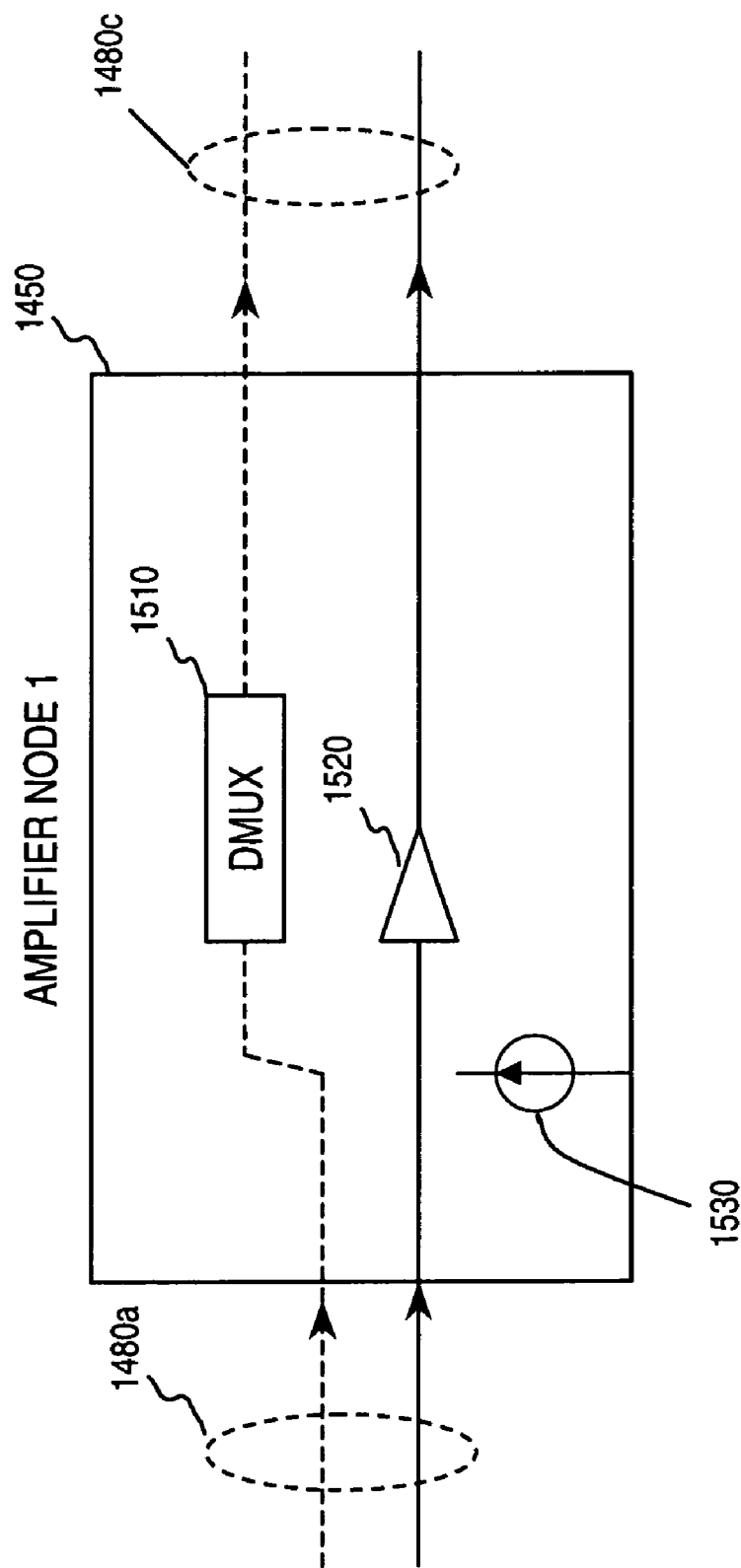
FIG. 15 is a block diagram showing an exemplary embodiment of an amplifier node in accordance with the present invention.

FIG. 15 is a block diagram showing an exemplary embodiment of the amplifier node in accordance with the present invention. It should be noted that FIG. 15 merely illustrates a portion of the amplifier node. Referring back to FIG. 14, the switching node 1410 communicates with the amplifier node 1480 via optical links or lines 1480a and 1480b in a bi-directional manner. FIG. 15 illustrates the corresponding portion of the amplifier node 1450 which handles traffic or signals coming in from line 1480a and going out through line 1480c. It should be understood that the amplifier node 1450 includes an identical portion which handles traffic or signals coming in from line 1480d and going out through line 1480b.

As shown in FIG. 15, line 1480a may be further broken down to carry two types of traffic, namely, network status information and payload. The network status information may be delivered via an OSC. In an exemplary embodiment, the amplifier node 1450 includes a demultiplexor 1510 for receiving the network status information, an amplifier 1520 for amplifying the input signals, namely, the payload, and a photodetector 1530 for detecting the optical power level of the input signals coming into the amplifier 1520. The amplifier node 1450 further includes control logic which is configured to detect OSC input signal failure and monitor the optical power of the input signals being fed into the amplifier 1520. The control logic is further configured to generate a fault report when the optical power of the input signals being fed into the amplifier 1520 falls below an acceptable level, thereby indicating occurrence of a line fault or loss of signal. In an exemplary implementation, the control logic is implemented using software in either an integrated or modular manner. Alternatively, the control logic may also be implemented using hardware. Based on disclosure provided herein, a person of ordinary skill in the art will know of ways and/or methods to implement the control logic using either software or hardware or a combination of both.

In an exemplary mode of operation, the control logic of the amplifier node 1450 cooperates with the photodetector 1530 and determines that the optical power of the input signals being fed into the amplifier 1520 falls below the acceptable level thereby indicating occurrence of a line fault or loss of signal. A person of ordinary skill in the art will know how to define the acceptable level to identify a line fault or loss of signal. In response, the control logic generates a fault report and forwards the fault report to a downstream node. If the downstream node is another amplifier node, this other amplifier node simply forwards the fault report to the next downstream node. The fault report is forwarded until it reaches the first downstream switching node which then processes the fault report and takes any appropriate switching action if necessary. The fault report may be included as part of the network status information and may be delivered via the OSC. Various situations will be described below to illustrate exemplary operations of the amplifier node.

Figure 16:
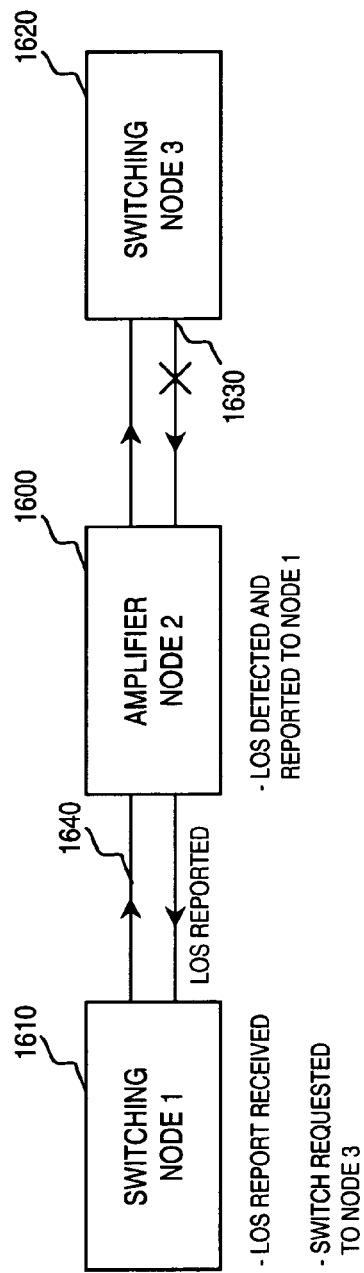
FIG. 16 is a schematic diagram illustrating a situation in which an incoming line fault is detected by an amplifier node.

FIG. 16 illustrates a situation in which an incoming line fault is detected by an amplifier node. As shown in FIG. 16, an amplifier node 1600 is located between switching nodes 1610 and 1620. A problem arises with respect to line 1630 going into the amplifier node 1600 causing a loss-of-signal (LOS) condition. The problem may be caused by, for example, a line fault or a fiber break. Upon detecting the LOS condition, the amplifier node 1600 generates a fault report and forwards the fault report to the downstream switching node 1610 reporting the LOS condition. In turn, upon receiving the fault report from the amplifier node 1600, the switching node 1610 initiates the necessary switching actions, if any, to restore traffic coming from the direction of the switching node 1620. For example, the switching node 1610 may issue a switch request on line 1640 to the amplifier node 1600 which, in turn, forwards the request to the switching node 1620.

Figure 17:
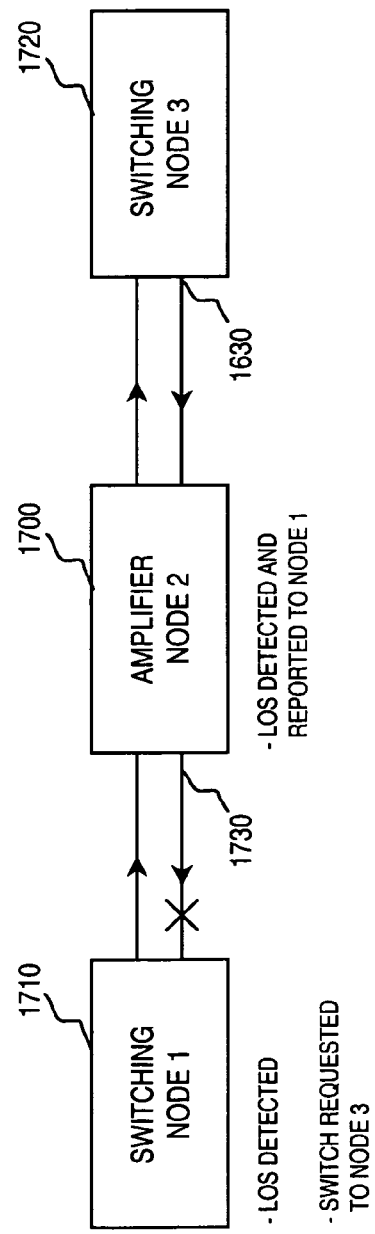
FIG. 17 is a schematic diagram illustrating a situation in which an incoming line fault is detected by a switching node.

FIG. 17 illustrates a situation in which an incoming line fault is detected by a switching node. As shown in FIG. 17, an amplifier node 1700 is located between switching nodes 1710 and 1720. A problem arises with respect to line 1730 going out of the amplifier node 1700 and into the switching node 1710 causing a LOS condition. In this situation, the amplifier node 1700 does not detect the LOS condition on its outgoing line 1730. Instead, the LOS condition is detected directly by the switching node 1710 which then initiates the necessary switching actions, if any, to restore traffic coming from the direction of the switching node 1720.

FIG. 18 illustrates a situation in which a line fault occurs between two adjacent amplifier nodes. As shown in FIG. 18, two amplifier nodes 1800 and 1810 are located between switching nodes 1820 and 1830. A problem arises with respect to line 1840 connecting the amplifier nodes 1800 and 1810 causing a LOS condition. The LOS condition is detected by the amplifier node 1800 which then accordingly generates a fault report. The fault report is then forwarded to the downstream switching node 1820 which, in turn, initiates the necessary switching actions, if any, to restore traffic coming from the direction of the switching node 1830. It should be noted that if the downstream switching node 1820 is not a switching node, i.e., if the downstream node is not capable of initiating any switching action, then the fault report is forwarded until it reaches the next switching node.

FIG. 19 illustrates a situation in which outgoing line faults occur between two switching nodes. As shown in FIG. 19, two amplifier nodes 1900 and 1910 are located between switching nodes 1920 and 1930. A first problem arises with respect to line 1940 connecting the amplifier node 1900 and the switching node 1920 and a second problem arises with respect to line 1950 connecting the amplifier node 1910 and the switching node 1930. Amplifier nodes 1900 and 1910 both detect a LOS condition on lines 1940 and 1950 respectively. As a result, fault reports are generated by the amplifier nodes 1900 and 1910 and forwarded to the switching nodes 1930 and 1920 respectively. Switching nodes 1920 and 1930 then accordingly initiate the necessary actions, if any, to restore traffic. In this situation, the two problems relating to lines 1940 and 1950 collectively constitute a bi-directional line failure or fiber break in the optical fiber span between the switching nodes 1920 and 1930. Hence, communications between the switching nodes 1920 and 1930 are restored via some other intermediate switching nodes.

Figure 20:
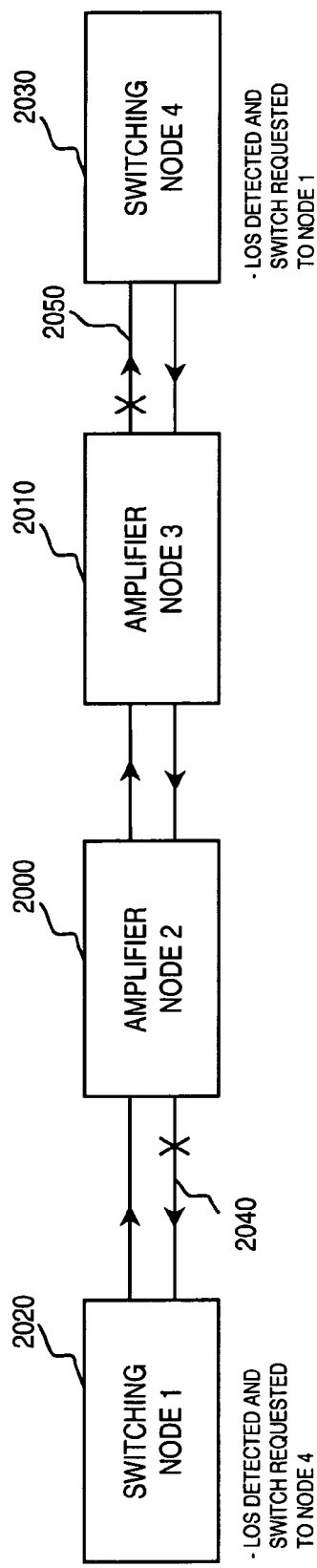
FIG. 20 is a schematic diagram illustrating a situation in which two incoming line faults occur between two switching nodes.

FIG. 20 illustrates a situation in which incoming line faults occur between two switching nodes. As shown in FIG. 20, two amplifier nodes 2000 and 2010 are located between switching nodes 2020 and 2030. A first problem arises with respect to line 2040 connecting the amplifier node 2000 and the switching node 2020 and a second problem arises with respect to line 2050 connecting the amplifier node 2010 and the switching node 2030. Since lines 2040 and 2050 carry traffic or signals away from the amplifier nodes 2000 and 2010 respectively, the amplifier nodes 2000 and 2010 do not detect the resulting LOS conditions. The resulting LOS conditions are, instead, detected directly by the switching nodes 2020 and 2030 respectively. Switching nodes 2020 and 2030 then accordingly initiate the necessary actions, if any, to restore traffic. Similar to the situation shown in FIG. 19, in this situation, the two problems relating to lines 2040 and 2050 collectively constitute a bi-directional line failure or fiber break in the optical fiber span between the switching nodes 2020 and 2030. Hence, communications between the switching nodes 2020 and 2030 are restored via some other intermediate switching nodes.

FIG. 21 illustrates a situation in which two line faults occur in one direction between two switching nodes having two amplifier nodes located therebetween. As shown in FIG. 21, two amplifier nodes 2100 and 2110 are located between switching nodes 2120 and 2130. A first problem arises with respect to line 2140 connecting the amplifier node 2100 and the switching node 2120 and a second problem arises with respect to line 2150 connecting the amplifier node 2110 and the switching node 2130. Line 2140 carries traffic or signals from the switching node 2120 to the amplifier node 2100 and line 2150 carries traffic or signals from the amplifier node 2110 to the switching node 2130. Hence, lines 2140 and 2150 carry traffic in the same direction. Upon detecting the LOS condition on line 2140, the amplifier node 2100 generates and forwards a fault report to the next downstream node which, in this case, is the amplifier node 2110. Since the amplifier node 2110 is incapable of initiating any switching action, the fault report is passed through to the switching node 2130. At the same time, the switching node 2130 also detects a LOS condition on line 2150. It should be noted that the fault report may be passed to the switching node 2130 via an OSC which is separate from line 2150. Upon receiving the fault report and/or detecting the LOS condition on line 2150, the switching node 2130 then takes appropriate switching actions, if any, to restore traffic between switching nodes 2120 and 2130. In this situation, since there are two line faults in the same direction, the switching node 2130 may need to prioritize the two line faults for restoration. The prioritization can be done using information from the fault report received from the amplifier node 2110 and information derived from detecting the LOS condition on line 2150. For example, if it is determined that the line fault on line 2140 is attributed to a malfunctioning component within the switching node 2120 and that the line fault on line 2150 is attributed to a fiber break between the switching node 2130 and the amplifier node 2110, then the switching node 2130 may elect to initiate switching actions to remedy the more serious line fault, in particular, the line fault on line 2150.

FIG. 22 illustrates a situation in which two line faults in the same direction are prioritized by the amplifier node. As shown in FIG. 22, two amplifier nodes 2200 and 2210 are located between switching nodes 2220 and 2230. A first problem arises with respect to line 2240 connecting the amplifier node 2200 and the switching node 2220 and a second problem arises with respect to line 2250 connecting the two amplifier nodes 2200 and 2210. Line 2240 carries traffic or signals from the switching node 2220 to the amplifier node 2200 and line 2250 carries traffic or signals from the amplifier node 2200 to the amplifier node 2210. Hence, lines 2240 and 2250 carry traffic in the same direction. Upon detecting the LOS condition on line 2240, the amplifier node 2200 generates and forwards a fault report to the next downstream node which, in this case, is the amplifier node 2210. In a normal situation, the amplifier node 2210 will simply pass the fault report along to the switching node 2230. In this particular situation, however, the amplifier node 2210 also detects a LOS condition on line 2250. Using information from the fault report received from the amplifier node 2200, the amplifier node 2210 then prioritizes the LOS conditions respectively detected on lines 2240 and 2250 and generates a fault report which is subsequently forwarded to the switching node 2230. Using information from the fault report received from the amplifier node 2210, the switching node 2230 then takes switching actions, if any, to remedy the LOS condition or line fault which has a higher priority.

Figure 23:
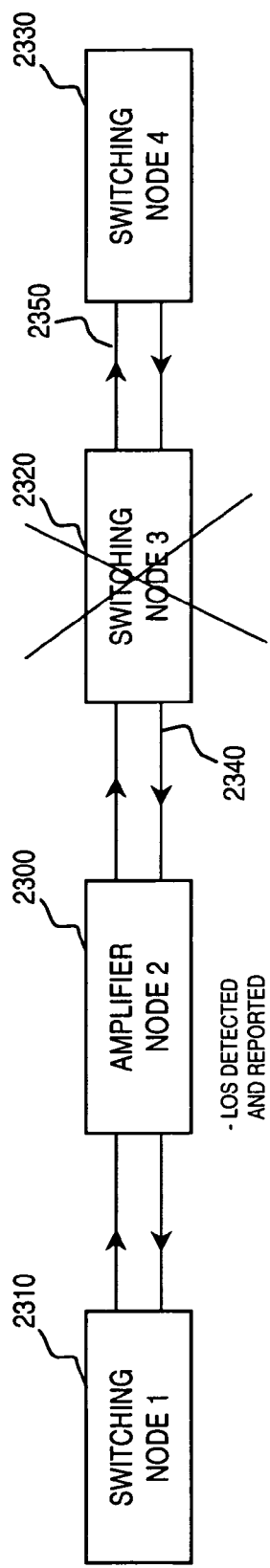
FIG. 23 is a schematic diagram illustrating a situation in which a switching node fails.

FIG. 23 illustrates a situation in which a switching node fails. As shown in FIG. 23, the amplifier node 2300 is located between switching nodes 2310 and 2320 and switching node 2330 is directly connected to switching node 2320. In this particular situation, the switching node 2320 fails. As a result, the amplifier node 2300 detects a LOS condition on its incoming line 2340 from the direction of the switching node 2320. The amplifier node 2300 then generates a fault report which is then passed to the switching node 2310. switching node 2310 then initiates any necessary switching actions to bypass the failed switching node 2320. On the other side of the failed switching node 2320, the switching node 2330 directly detects a LOS condition along its incoming line 2350 and similarly takes switching actions, if any, to bypass the failed switching node 2320.

Figure 24:
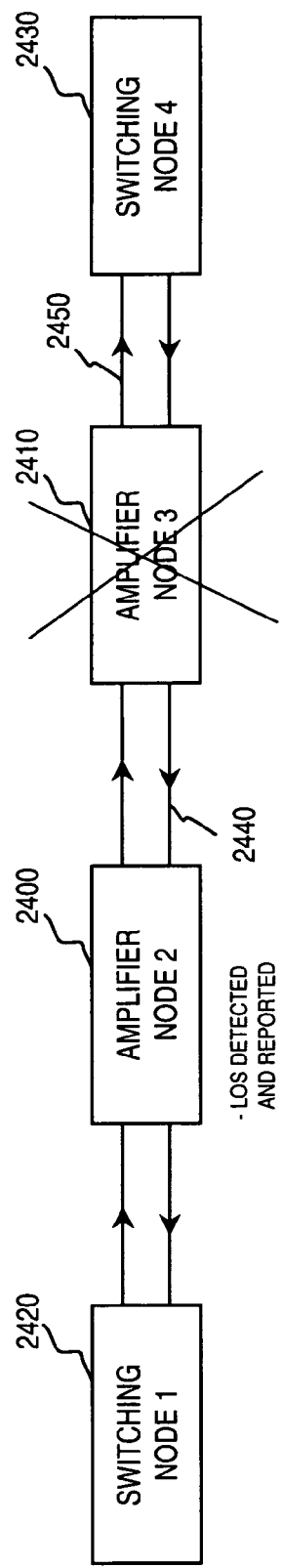
FIG. 24 is a schematic diagram illustrating a situation in which an amplifier node fails.

FIG. 24 illustrates a situation in which an amplifier node fails. As shown in FIG. 24, two amplifier nodes 2400 and 2410 are located between two switching nodes 2420 and 2430. In this situation, the amplifier node 2410 fails. As a result, the amplifier node 2400 detects a LOS condition on its incoming line 2440 from the direction of the amplifier node 2410. The amplifier node 2400 then generates a fault report which is then passed to the switching node 2420. Switching node 2420 then initiates any necessary switching actions to re-route the signals to the switching node 2430 via some other intermediate switching nodes. On the other side of the failed amplifier node 2410, the switching node 2430 directly detects a LOS condition along its incoming line 2450 and similarly takes switching actions, if any, to re-route the signals to the switching node 2420 via some other intermediate switching nodes.

Figure 25:
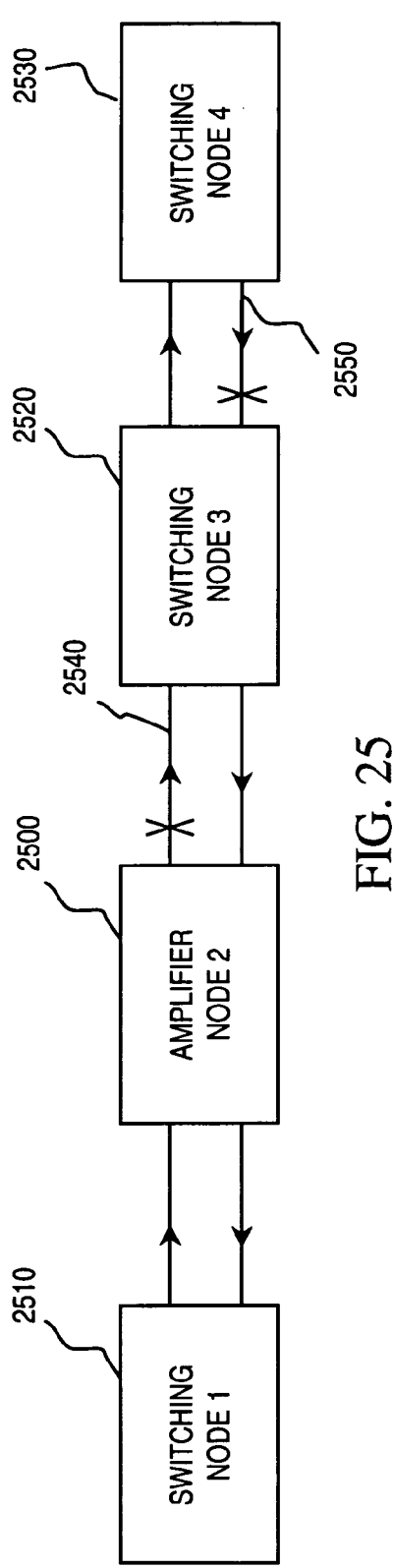
FIG. 25 is a schematic diagram illustrating a situation in which a switching node is unable to receive any incoming traffic.

FIG. 25 illustrates a situation in which a switching node is unable to receive any incoming traffic. As shown in FIG. 25, an amplifier node 2500 is located between switching nodes 2510 and 2520 and the switching node 2530 is directly connected to the switching node 2520. In this situation, the switching node 2520 is unable to receive any incoming traffic via lines 2540 and 2550. As a result, the switching node 2520 issues switch requests to its respective neighboring switching nodes, namely, switching nodes 2510 and 2530, to initiate switching actions, if any, to bypass the switching node 2520. One switch request is transmitted directly to the switching node 2530, and the other switch request is transmitted to the switching node 2510 via the amplifier node 2500. As described above, since the amplifier node 2500 does not perform any switching action, the amplifier node 2500 simply passes the switch request through to the intended switching node 2510.

Figure 26:
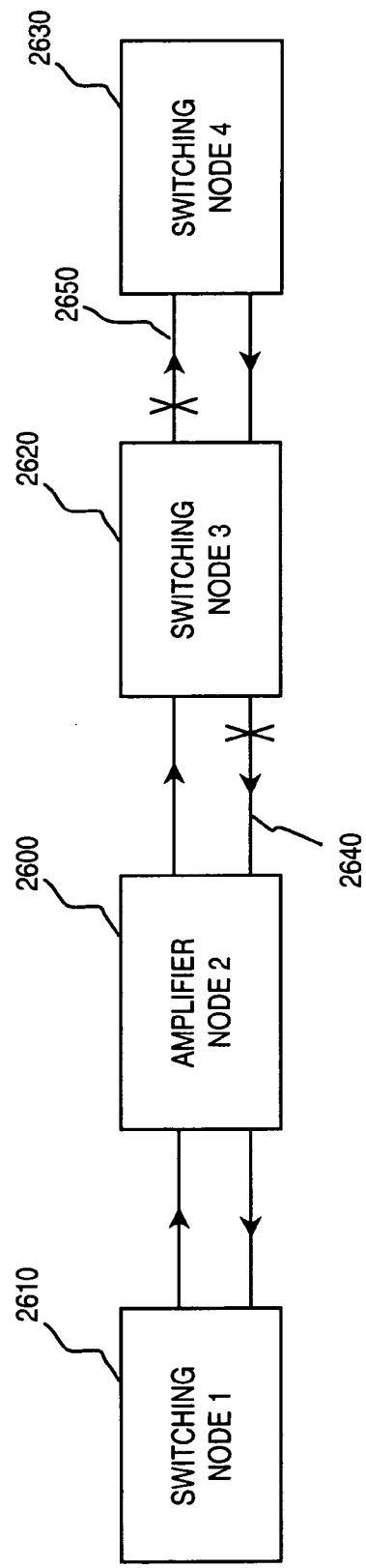
FIG. 26 is a schematic diagram illustrating a situation in which a switching node is unable to transmit any outgoing traffic.

FIG. 26 illustrates a situation in which a switching node is unable to transmit any outgoing traffic. As shown in FIG. 26, an amplifier node 2600 is located between switching nodes 2610 and 2620 and the switching node 2630 is directly connected to the switching node 2620. In this situation, the switching node 2620 is unable to transmit any outgoing traffic via lines 2640 and 2650. Since the switching node 2620 is unable to transmit any outgoing traffic, no switch request can be originated from the switching node 2620. Instead, the amplifier node 2600 detects a LOS condition on line 2640 and accordingly generates a fault report which is then forwarded to the switching node 2610. The switching node 2610 then initiates appropriate switching actions, if any, to bypass the switching node 2620. On the other side of the switching node 2620, a LOS condition on line 2650 is detected directly by the switching node 2630 which then also takes appropriate switching actions, if any, to bypass the switching node 2620.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and system of the present invention disclosed herein without departing from the spirit and scope of the invention as defined in the appended claims. All publications, patents, and patent applications cited herein are hereby incorporated by reference for all purposes in their entirety.

What is claimed is:

1. A system for detecting faults in an optical network, comprising:
   a first node and a second node; and
   an amplifier node coupled between the first node and the second node, the amplifier node configured to detect a fault on an optical link connecting the amplifier node and the first node and generate a fault report upon detection of the fault, the fault report comprising information regarding one of a planned restoration event and the results of an executed restoration event, the amplifier node is further configured to directly forward the fault report to the second node, the second node configured to detect faults that occur on the optical link connecting the amplifier node to the second node.

2. The system according to claim 1 wherein upon receiving the fault report from the amplifier node, if the second node is capable of switching traffic, the second node initiates a switching action to restore traffic between the first node and the second node; and if the second node is not capable of switching traffic, the second node forwards the fault report to a third node.

3. The system according to claim 2 wherein the fault report is forwarded until the fault report is received by a node which capable of switching traffic.

4. The system according to claim 1 wherein the second node is capable of switching traffic and is configured to:
   detect a fault on an optical link carrying optical signals into the second node; and
   upon receipt of the fault report from the amplifier node, prioritize the fault report and the fault detected by the second node.

5. The system according to claim 1 wherein the amplifier node is further configured to receive and pass a fault report from another amplifier node to the second node.

6. The system according to claim 1 wherein the amplifier node is further configured to:
   receive a fault report from another amplifier node;
   prioritize the received fault report and the generated fault report; and
   forward whichever fault report that has a higher priority to the second node.

7. The system according to claim 1 wherein the optical network is a bi-directional line switched ring network.

8. The system according to claim 1 wherein the fault on the optical link is detected based on a loss-of-signal condition.

9. The system according to claim 8 wherein the amplifier node comprises:
an input signal power detector configured to monitor input power of the optical link; and
control logic configured to evaluate output from the input signal power detector to determine if the loss-of-signal condition exists.

10. A method for detecting faults in an optical network having an amplifier node coupled between a first node and second node, comprising:
detecting a loss-of-signal condition on an optical link carrying optical signals from the first node to the amplifier node;
causing the amplifier node to generate a fault report reporting occurrence of the loss-of-signal condition, the fault report comprising information regarding one of a planned restoration event and the results of an executed restoration event; and
directly forwarding the fault report to the second node, the second node configured to detect faults that occur on the optical link connecting the amplifier node to the second node.

11. The method of claim 10 further comprising:
if the second node is capable of switching traffic, causing the second node to initiate a switching action to restore traffic between the first node and the second node; and
if the second node is not capable of switching traffic, forwarding the fault report from the second node to another node.

12. The method of claim 11 further comprising:
forwarding the fault report until the fault report is received by a node which is capable of switching traffic.

13. The method of claim 10 further comprising:
if the second node is capable of switching traffic, detecting a fault on an optical link carrying optical signals into the second node; and upon receipt of the fault report from the amplifier node, prioritizing the fault report and the fault detected by the second node.

14. The method of claim 10 further comprising:
causing the amplifier node to receive and pass a fault report from another amplifier node to the second node.

15. The method of claim 10 further comprising:
causing the amplifier node to receive a fault report from another amplifier node;
prioritizing the received fault report and the generated fault report; and
forwarding whichever fault report that has a higher priority to the second node.

16. The method of claim 10 wherein the optical network is a bi-directional line switched ring network.

17. An optical network comprising:
a plurality of switching nodes connected to one another, at least one switching node capable of switching traffic; and
a plurality of amplifier nodes;
wherein:
at least one amplifier node is coupled between selective pairs of switching nodes; and
the least one amplifier node is configured to detect a fault on an incoming optical link carrying optical signals into that amplifier node, generate a fault report upon detection of the fault, the fault report comprising information regarding one of a planned restoration event and the results of an executed restoration event, and directly forward the fault report to a neighboring node.

18. The optical network of claim 17 wherein:
upon receiving the fault report, if the neighboring node is a switching node, the neighboring node initiates a switching action to restore traffic; and if the neighboring node is not a switching node, the neighboring node forwards the fault report to another node.

19. The optical network of claim 18 wherein the fault report is forwarded until the fault report is received by a switching node.

20. The optical network of claim 17 wherein the at least one switching node is configured to:
detect a fault on an incoming optical link carrying optical signals into that switching node; and
upon receipt of a fault report from an amplifier-node, prioritize the received fault report and the fault detected by that switching node.

21. The optical network of claim 17 wherein the at least one amplifier node is further configured to receive and pass a fault report from another amplifier node to a switching node.

22. The optical network of claim 17 wherein the at least one amplifier node is configured to:
receive a fault report from another amplifier node;
prioritize the received fault report and the generated fault report; and
forward whichever fault report that has a higher priority to the neighboring node.

23. The optical network of claim 17 wherein the optical network is a bi-directional line switched ring network.

24. The optical network of claim 17 wherein the fault on the incoming optical link is detected based on a loss-of-signal condition.

25. The optical network of claim 24 wherein the at least one amplifier node comprises:
an input signal power detector configured to monitor input power of the incoming optical link; and
control logic configured to evaluate output from the input signal power detector to determine if the loss-of-signal condition exists.

26. An amplifier node for use in an optical network, comprising:
an input signal power detector configured to monitor input power of an incoming optical link received by the amplifier node; and
control logic configured to:
evaluate output from the signal power detector to determine if a loss-of-signal condition thereby indicating a fault on the incoming optical link; and
generate a fault report reporting the loss-of-signal condition, the fault report comprising information regarding one of a planned restoration event and the results of an executed restoration event;
wherein the control logic is further configured to directly forward the fault report to a switching node to allow the switching node to initiate a switching action.

27. The amplifier node of claim 26 wherein the control logic is further configured to:
receive a fault report from another amplifier node;
prioritize the received fault report and its own generated fault report; and
forward whichever fault report that has a higher priority to a switching node.

28. The amplifier node of claim 26 wherein the optical network is a bi-directional line switched ring network.

* * * * *